(12) United States Patent
Adelman

(10) Patent No.: US 10,759,044 B2
(45) Date of Patent: *Sep. 1, 2020

(54) DEVICE AND METHOD FOR CONTROLLED MOTION OF A TOOL

(71) Applicant: ELYTRA TECHNOLOGIES LLC, Wayne, PA (US)

(72) Inventor: Thomas L. Adelman, Wayne, PA (US)

(73) Assignee: ELYTRA TECHNOLOGIES, LLC, Wayne, PA (US)

(*) Notice: Subject to any disclaimer, the term of this patent is extended or adjusted under 35 U.S.C. 154(b) by 72 days.

This patent is subject to a terminal disclaimer.

(21) Appl. No.: 16/115,902

(22) Filed: Aug. 29, 2018

(65) Prior Publication Data

US 2019/0193259 A1 Jun. 27, 2019

Related U.S. Application Data

(63) Continuation of application No. 14/213,654, filed on Mar. 14, 2014, now Pat. No. 10,086,509.

(Continued)

(51) Int. Cl.
*B25J 1/02* (2006.01)
*B25J 9/16* (2006.01)
(Continued)

(52) U.S. Cl.
CPC . *B25J 1/02* (2013.01); *B25J 7/00* (2013.01); *B25J 9/1682* (2013.01); *B25J 13/085* (2013.01);
(Continued)

(58) Field of Classification Search
CPC ..... B25J 1/02; B25J 13/085; B25J 7/00; B25J 9/06; B25J 9/10; B25J 9/16; B25J 9/1682;
(Continued)

(56) References Cited

U.S. PATENT DOCUMENTS 4,320,692 A * 3/1982 Komiya ............. F03C 1/046
91/497
4,853,874 A 8/1989 Iwamoto et al.
(Continued)

OTHER PUBLICATIONS

U.S. Appl. No. 14/213,654 Office Action dated Apr. 20, 2017.
(Continued)

*Primary Examiner* — Rachid Bendidi
(74) *Attorney, Agent, or Firm* — Troutman Pepper Hamilton Sanders LLP

(57) ABSTRACT

The present invention relates to devices and methods for controlled motion of a tool. In one embodiment, the device can support a tool needed to perform an activity requiring a highly-precise, stable motion, while also accommodating a person's hand for the purposes of moving the tool. In another embodiment, the device of the present invention allows for rotational motion of a tool independently of the directive motion of the tool. In yet another embodiment, the present invention relates to the design of a force transducer useful in a cooperative robot. The device and methods of the present invention are particularly useful for microsurgery or other tasks that are typically performed using cooperative robotics.

17 Claims, 14 Drawing Sheets

Related U.S. Application Data

(60) Provisional application No. 61/802,149, filed on Mar. 15, 2013, provisional application No. 61/784,972, filed on Mar. 14, 2013.

(51) Int. Cl.
  *B25J 7/00* (2006.01)
  *B25J 13/08* (2006.01)

(52) U.S. Cl.
  CPC ............. *G05B 2219/39101* (2013.01); *G05B 2219/39199* (2013.01); *G05B 2219/40415* (2013.01); *Y10S 901/09* (2013.01)

(58) Field of Classification Search
  CPC ........... G05B 2219/39101; G05B 2219/39199; G05B 2219/40415; Y10S 901/01; Y10S 901/02; Y10S 901/09; Y10S 901/46; A61B 19/2203
  See application file for complete search history.

(56) References Cited

U.S. PATENT DOCUMENTS

| | | | |
|---|---|---|---|
| 5,952,796 A | 9/1999 | Colgate et al. | |
| 6,246,200 B1 | 6/2001 | Blumenkranz et al. | |
| 6,424,885 B1 | 7/2002 | Niemeyer et al. | |
| 6,902,560 B1 | 6/2005 | Morley et al. | |
| 7,398,707 B2 | 7/2008 | Morley et al. | |
| 7,689,320 B2 | 3/2010 | Prisco et al. | |
| 7,914,522 B2 | 3/2011 | Morley et al. | |
| 8,528,440 B2 | 9/2013 | Morley et al. | |
| 9,550,293 B2 | 1/2017 | Hatakeyama | |
| 2002/0176683 A1* | 11/2002 | Harman | G02B 6/4226 385/137 |
| 2004/0078114 A1 | 4/2004 | Cordell et al. | |
| 2005/0166413 A1 | 8/2005 | Crampton | |
| 2011/0023651 A1 | 2/2011 | Cooper | |
| 2011/0125165 A1 | 5/2011 | Simaan et al. | |
| 2013/0131867 A1* | 5/2013 | Olds | B25J 9/0051 700/260 |
| 2013/0296884 A1 | 11/2013 | Taylor et al. | |
| 2013/0304258 A1 | 11/2013 | Taylor et al. | |
| 2014/0005682 A1 | 1/2014 | Worrell et al. | |
| 2014/0277740 A1 | 9/2014 | Adelman | |
| 2016/0096271 A1 | 4/2016 | Taylor et al. | |
| 2018/0021096 A1 | 1/2018 | Kostrzewski et al. | |

OTHER PUBLICATIONS

U.S. Appl. No. 14/213,654 Final Office Action dated Nov. 30, 2017.
Notice of Allowance dated May 17, 2018 in U.S. Appl. No. 14/213,654.
Nontinal Office Action dated May 30, 2018 in U.S. Appl. No. 15/268,964.
Notice of Allowance dated Jan. 8, 2019 in U.S. Appl. No. 15/268,964.

* cited by examiner

DEVICE AND METHOD FOR CONTROLLED MOTION OF A TOOL

CROSS-REFERENCE TO RELATED APPLICATIONS

The present application is a continuation of U.S. application Ser. No. 14/213,654, filed Mar. 14, 2014, now issued as U.S. Pat. No. 10,086,509, which claims priority to U.S. Provisional Patent Application No. 61/784,972, filed Mar. 14, 2013, and U.S. Provisional Patent Application No. 61/802,149, filed Mar. 15, 2013, which are incorporated by reference herein in their entirety.

BACKGROUND OF THE INVENTION

Cooperative or collaborative robot devices, i.e., cobots, are devices that generally require a human operator to interact physically with the robot to perform a task, such as manipulating a tool, rather than the robot acting relatively autonomously based on little or no human instruction. Such cobots are particularly useful for performing tasks requiring a level of precision that is difficult or impossible for a human to attain without assistance. For example, microsurgery, i.e., surgery requiring manipulation on a sub-millimeter scale, is a task that is particularly well-suited for the use of a cobot device.

Cobot devices and methods currently available in the art include the cobots described by Colgate and Peshkin (U.S. Pat. No. 5,952,796); the method of cooperative control of a surgical tool described by Taylor et al. (US Patent App. Pub. No. 2013/0296884 and US Patent App. Pub. No. 2013/0304258): the steady hand micromanipulation robot described by Olds and Taylor (US Patent App. Pub. No. 2013/0131867); and the DA VINCI™ surgical system by Intuitive Surgical Operations (see e.g. U.S. Pat. Nos. 6,902,560, 7,398,707, 7,914,522, and 8,528,440).

However, currently available devices for cooperative robot control can be extremely expensive. Further, these devices often provide a high degree of freedom for the tool that is being controlled, at the expense of providing optimal precision and stability.

Thus, there is a continuing need in the art for devices and methods that can provide stable, high-precision controlled motion of a tool. The present invention addresses this continuing need in the art.

SUMMARY OF INVENTION

The present invention relates to devices and methods for controlled motion of a tool. In one embodiment, the device of the present invention is a device for reducing tremor in a tool, comprising: a grip suitable for engaging a tool, a sensor assembly connected to the grip, a micromanipulator associated with the grip, and at least one microprocessor operatively connected with the micromanipulator and the sensor assembly, wherein when a force is applied to the grip, the sensor assembly sends an input signal to the microprocessor indicative of the applied force, and upon receiving the input signal, the microprocessor sends an output signal to the micromanipulator directing the micromanipulator to apply movement to the grip in the direction of the applied force. In one embodiment, the micromanipulator is associated with the grip via the sensor assembly. In one embodiment, the output signal is produced by applying a gain to the input signal.

In one embodiment, the device further comprises a tool. In one embodiment, the tool is selected from the group consisting of a forceps, scalpel, and drill.

In various embodiments, the device can comprise a base. In one embodiment, an end of the sensor assembly is connected to the base. In another embodiment, the base comprises the micromanipulator. In another embodiment, the base comprises a mechanism for securing the base to a surface.

In various embodiments, the grip of the device of the present invention can comprise other components. In one embodiment, the grip comprises a tool holder. In one embodiment, when a tool is connected to the tool holder, the tool holder allows a first portion of the tool to be rotated along an axis while a second portion of the tool is maintained in a constant position. In another embodiment, when a tool is connected to the tool holder, the tool holder selectively prevents rotational motion of the tool. In yet another embodiment, the tool holder can be rotated without transferring significant applied force to the sensor assembly. In one embodiment, the grip is connected to the sensor assembly via a bracket. In another embodiment, the grip is connected to the sensor assembly via a rotational housing. In another embodiment, the grip comprises a fixed point mechanism, so that as the tool is rotated, a point near the tool tip remains approximately stationary relative to the mounting point of the grip.

In one embodiment, the device of the present invention is a force transducer, i.e., a sensor subassembly, for a controlled-motion device comprising: a first support, a sensor connected to the first support, a second support, and a bridge connected to the second support, wherein the bridge further comprises a magnet, wherein the first support is connected to the second support via one or more sheets so that the first support and second support are separated by a gap, wherein the magnet is positioned near the sensor when the first support and second support are connected via the one or more sheets, and wherein the sensor can sense a change in position between the first support and second support when a force is applied to either the first support or the second support via a change in position of the magnet. In one embodiment, the sensor senses the vector component of the force that is perpendicular to the one or more sheets. In another embodiment, the change in position between the first support and the second support from the force is due to flexion of the one or more sheets.

In various embodiments, the sensor of the device of the present invention can be any sensor known in the art. In one embodiment, the sensor is selected from the group consisting of an optical, magnetic, inductive, and capacitive sensor.

In one embodiment, the sensor of the device of the present invention is a sensor assembly for sensing forces along three axes, comprising: a first fire e transducer, wherein said first force transducer can detect a force along an X-axis, a second force transducer, wherein the first support of said second force transducer is the second support of said first force transducer, and wherein said second force transducer can detect a force along a Y-axis, and a third force transducer, wherein the first support of said third force transducer is the second support of said second force transducer, and wherein said third force transducer can detect a force along a Z-axis. In one embodiment, the first, second, and/or third force transducers are the force transducers, i.e., sensor subassemblies, of the present invention described herein.

In one embodiment, the method of the present invention is a method for stabilizing the motion of a tool, comprising the steps of: sensing a force applied to a grip via a sensor assembly, wherein the grip is associated with a tool, sending an input signal to a microprocessor indicative of the applied force, sending an output signal from the microprocessor to a micromanipulator, wherein the output signal directs the micromanipulator to apply movement to the grip in the direction of the applied force. In one embodiment, the tool associated with the grip is selected from the group consisting of a forceps, scalpel, needle, and drill. In another embodiment, the output signal is produced by applying a gain to the input signal. In yet another embodiment, the micromanipulator applies movement to the grip via the sensor assembly.

BRIEF DESCRIPTION OF THE DRAWINGS

The following detailed description of various embodiments of the invention will be better understood when read in conjunction with the appended drawings. It should be understood, however, that the invention is not limited to the precis arrangements and instrumentalities of the embodiments shown in the drawings.

FIG. 3, comprising

FIGS. 8A and 8B, is a series of schematic diagrams showing an exemplary embodiment of a grip of the present invention.

DETAILED DESCRIPTION

Figure 1:
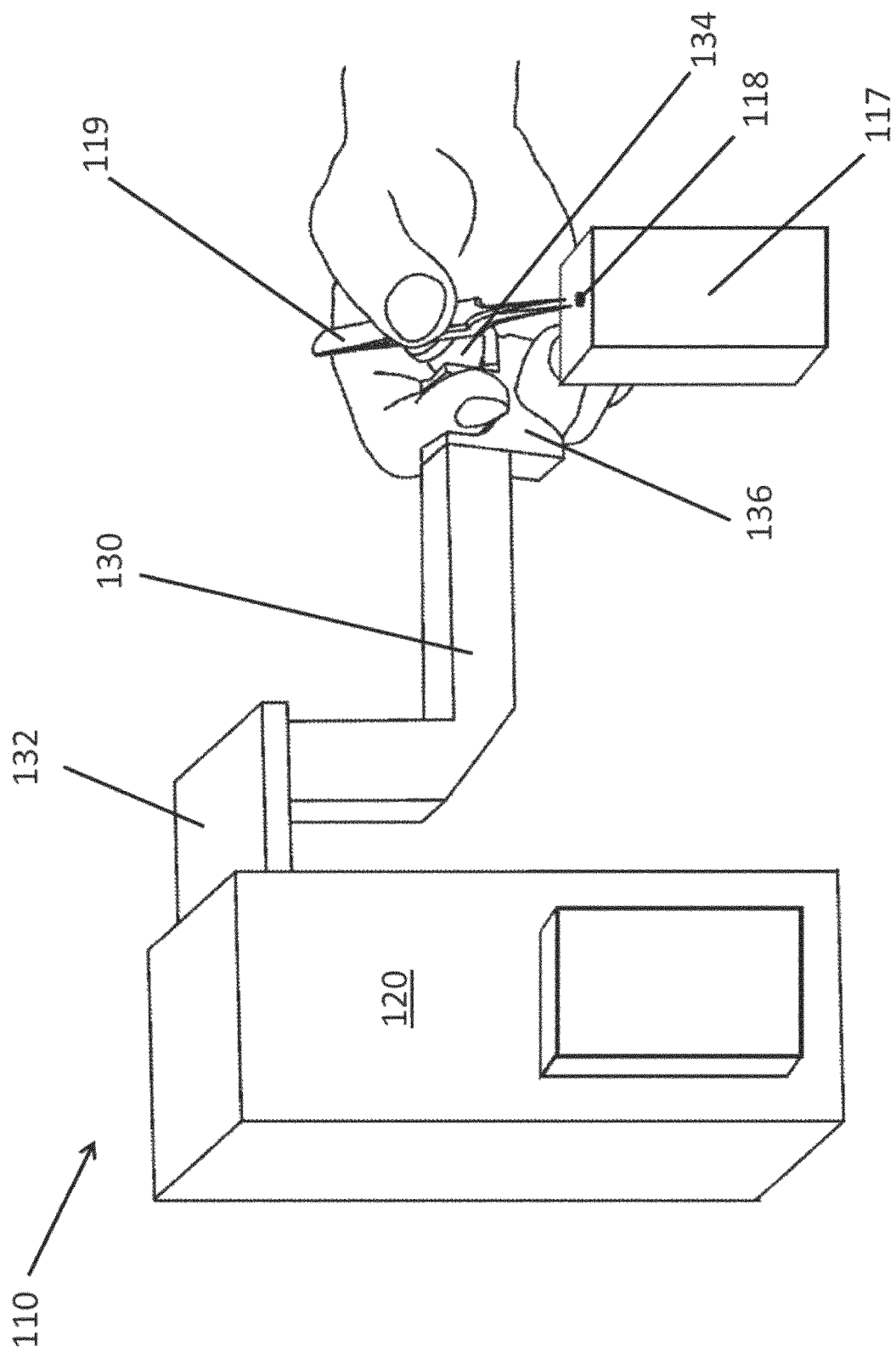
FIG. 1 is a schematic diagram of an exemplary embodiment of the device and the present invention and how it relates to an operator.

It is to be understood that the figures and descriptions of the present invention have been simplified to illustrate elements that are relevant for a clear understanding of the present invention, while eliminating, for the purpose of clarity, many other elements found in the field of electro-mechanical devices, robotics, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, and ±5%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Description

The present invention relates to devices and methods for stabilizing a person's hand while performing an activity, especially an activity requiring highly precise, stable motion. The device can support a tool needed to perform the activity while also accommodating a person's hand for the purposes of moving the tool. Alternatively, the device can accommodate and/or support a person's hand while the person holds such a tool.

In one aspect, the device comprises a sensor assembly that is sufficiently rigid to provide stabilizing support for the operator's fingers and/or hand. When an operator supplies directive force to a sensor assembly via the operator's fingers and/or hand, force transducers associated with the sensor assembly communicate the measured forces to a controller. The controller can combine the force information with other information, such as a gain setting, and apply a variety of algorithms to determine a motion response. The controller can then send signals to a driving system such as a 3-axis micromanipulator, which can move the sensor assembly, along with anything connected or in contact with the sensor assembly, including the operator's hand and/or any tool held by the operator or connected to the sensor assembly. In this way, the operator can guide the motion of his hand and tool while the hand and tool are being stabilized by the device.

In various embodiments, the device of the present invention can be used for any task where precise, stable motion initiated and/or controlled by a human is required. The device can be modified to accommodate any portion of a person's body that would be used to form such a precise function. In a preferred embodiment, the device is suitably designed for a person's hand. However, the device can be modified to accommodate a person's foot or other appendage, for example, the arm of an amputee. In addition, the device can be modified to accommodate any type of tool. For example, the device can be used for microsurgery, wherein the device accommodates a surgical tool such as a forceps or scalpel.

The device is particularly useful in reducing or eliminating the effect of a user's hand tremor on the function being performed. For example, a person's heart beat can create unintentional motions of the person's hand and, therefore, also in a tool that is being held in the person's hand. Further, most individuals display some amount of tremor in their hands that can be significantly larger than the motion due to heartbeats. A benefit of the device of the present invention is to significantly reduce such unintentional motion, and yet allow natural control of the translation of the hand within the travel range of the micromanipulator. An additional benefit of this device is that allows very precise motion of the hand to be done very slowly. For example, in free hand motion, people often seek better precision in a task by performing a motion quickly, but such quick motion has the disadvantage of preventing the person from perceiving the result of the motion while the motion is in progress. Using this device, the operator is able to move both precisely and slowly, if desired.

Referring now to FIG. 1, an exemplary embodiment of the device 110 of the present invention is shown. Device 110 includes a base 120 and a sensor assembly 130. In one embodiment, base 120 can be fastened securely to the surface on which it rests. In another embodiment, base 120 can include non slip pads to prevent movement of the base without being fastened to the surface on which it rests. In yet another embodiment, base 120 is shaped and/or is sufficiently heavy to provide stability, such that base 120 cannot slide on the surface on which it rests while in use. One end of sensor assembly 130 is mounted to base 120 via a bracket 132. A grip 136 is connected to the other end of arm. Grip 136 can be adapted to hold a tool 119, for example a forceps, and can also be adapted for a person's hand so that an operator can simultaneously hold grip 136 and tool 119. Accordingly, the operator of device 110 can use tool 119 to manipulate a sample 118 placed on pedestal 117.

The device 110 of the present invention is generally used as follows. An operator holds grip 136, wherein tool 119 is connected to grip 136 via tool support 134. Forces applied by the operator's hand through grip 136 are transmitted to sensor assembly 130 (shown in detail in FIG. 2). The other end of sensor assembly 130 is held fixed via a connection to bracket 132 which in turn is connected to base 120. The device further comprises a micromanipulator and also a microcontroller, i.e., a microprocessor, which can both be located in base 120. Device 110 provides sufficiently rigid support for the operator's hand so that the force from unintentional motions of the hand is significantly reduced. Accordingly, grip 136, sensor assembly 130, bracket 132, and base 120 each provide sufficient stiffness and rigidity to keep grip 136 and tool 119 from moving in an unintentional or unguided way.

When the operator applies a force to grip 136, the force is transmitted to sensor assembly 130. Sensor assembly 130 transmits information about the force to the microcontroller, which uses this information to provide instructions to the micromanipulator. The micromanipulator can then move bracket 132 and thus the connected assembly, including sensor assembly 130, grip 136, and tool 119, and may also send a signal back to the microcontroller. Accordingly, sensor assembly 130 is designed to provide a stabilizing counterforce to the operator's hand, and translate the hand, grip 136, and tool 119 in response to directive forces from the hand. The result is that device 110 dramatically reduces the speed and/or distance of the actual motion of the grip compared to the relative force applied by the operator. Accordingly, the operator has direct control over the movement of the grip and any tools associated with the grip, but the tool 119 and the operator's hand are significantly stabilized.

One advantage of the embodiment shown in FIG. 1, is that while tool 119 is directly supported by the device providing for stability and highly controlled motion, tool 119 can also be operated directly by a person's hand. For example, a forceps can be opened and closed using finger or thumb pressure. Other variations of tool control are possible. For example, a small motor can be used to open and close the forceps, or tools other than forceps can be used and some of these can also have the possibility for direct user control.

Typically, when the operator applies a force to grip 136 in a particular direction, the programming of the microcontroller would respond to the measured forces by sending a signal to the micromanipulator to move the assembly this same direction as the applied force, with a speed proportional to the force applied by the operator. This proportional control can be adjusted using a gain factor that sets the constant of proportionality for determining the speed from the applied force. In one embodiment, the gain factor can be adjusted using a foot pedal-controlled variable resistor, which is connected to the microcontroller, allowing the operator to actively control the responsiveness of the system. For example, the operator can set the gain to its highest value so the system moves quickly when far from the object, and reduce the gain during delicate procedures. The operator can also reduce the gain to zero so that the micromanipulator does not move sensor assembly in response to the applied forces. In one embodiment, there can still be some motion possible in the sensor assembly, due to the flexibility of sensor subassemblies, and using the system in this way can be useful for some tasks.

Figure 2:
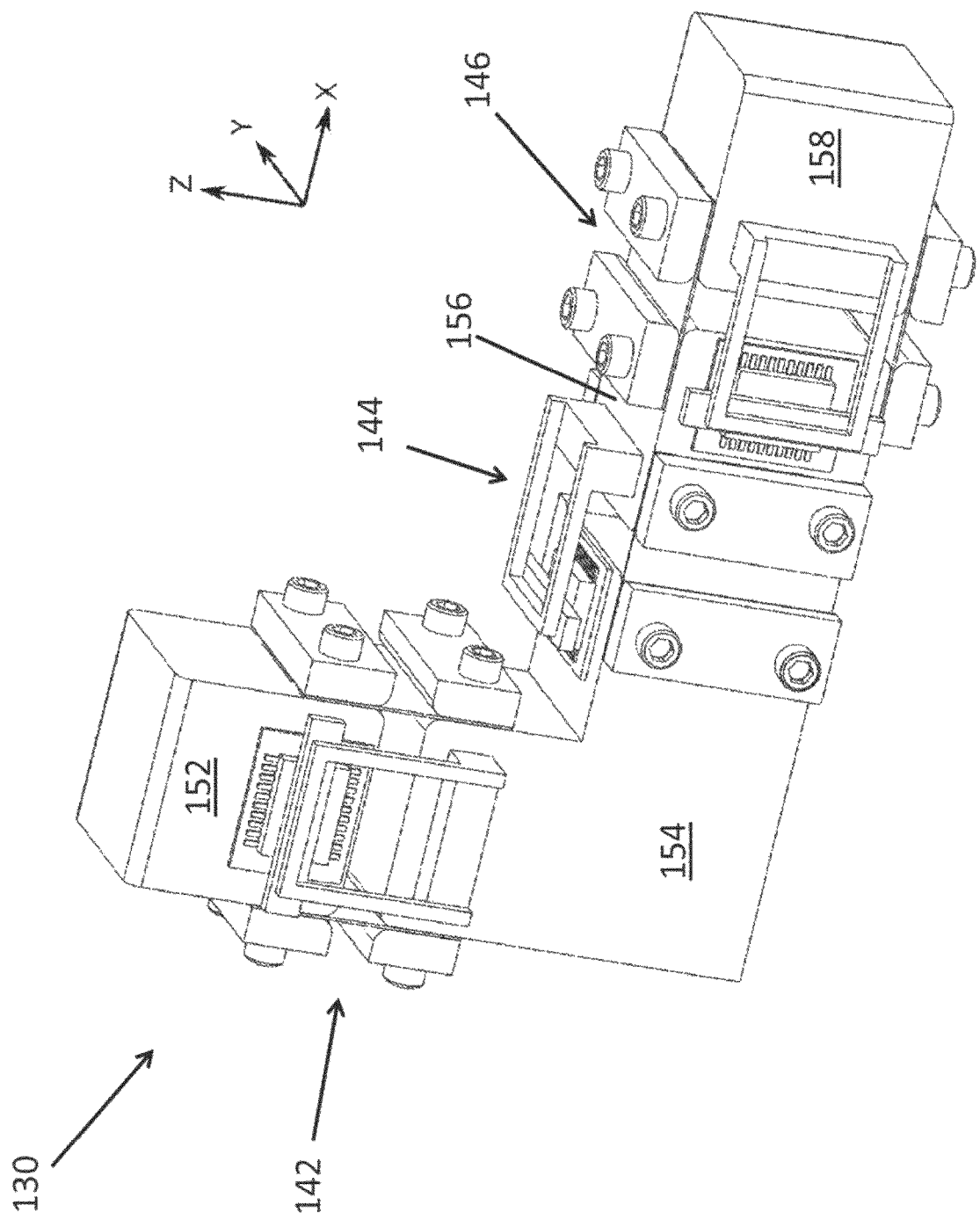
FIG. 2 is a schematic diagram of an exemplary embodiment of sensor assembly of the device of the present invention.

Referring now to FIG. 2, an exemplary embodiment of sensor assembly 130 is shown. Sensor assembly 130 comprises three sensor subassemblies 142, 144, and 146 that each respond to forces along a direction based on their respective orientation. Specifically, sensor subassembly 142 responds to movement along the X-axis, sensor subassembly 144 responds to movement along the Y-axis, and sensor subassembly 146 responds to movement along the Z-axis.

Figure 3A:
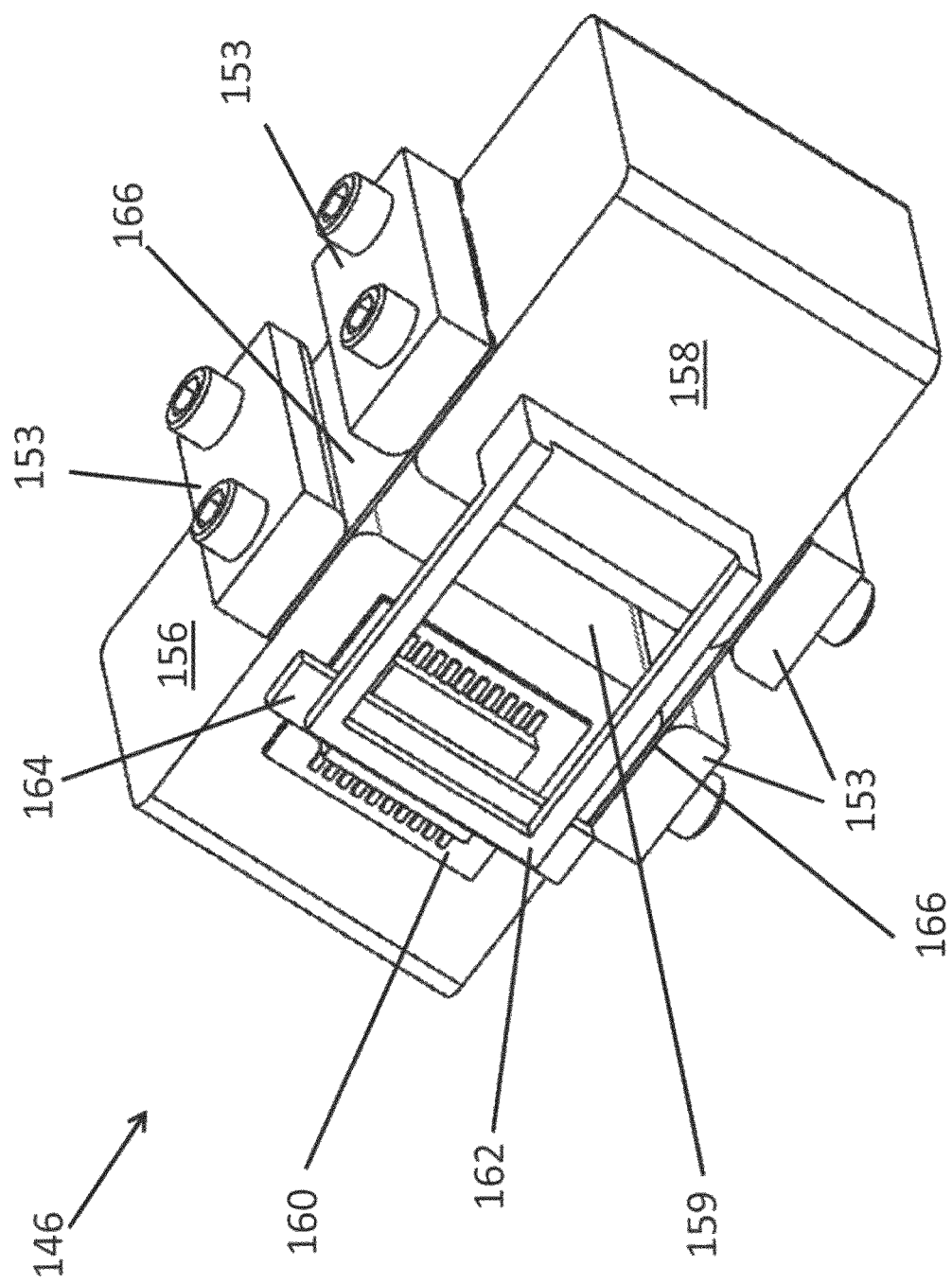
FIGS. 3A and 3B, is a set of schematic diagrams of exemplary embodiments of a sensor subassembly, i.e., force transducer, of the present invention.

Referring now to FIG. 3A, an exemplary embodiment of a sensor subassembly, or force transducer, is shown. Sensor subassembly 146 comprises a sensor 160 for measuring the relative motion between blocks 156 and 158. In one embodiment, sensor 160 is a TRACKER™ sensor (New Scale Technologies, Inc.). Sensor 160 measures any motion that is perpendicular to the surface of one or more sheets 166. Blocks 156 and 158 are similar in shape and size, and are held apart by sheets 166. In the exemplary embodiment shown, two sheets 166 are attached to opposite sides of blocks 156 and 158, wherein blocks 156 and 158 are spaced to create gap 159. The nearest faces of blocks 156 and 158 are held aligned and approximately parallel by sheets 166. In various embodiments, any number of sheets can be used to hold the blocks in alignment. Using more than two sheets can enhance aspects of the performance of the sensor subassembly, such as reduced rotation, and reduced translation in a non-preferred direction.

Sheets 166 are attached to blocks 156 and 158 via sheet fasteners 153. In one embodiment, as shown in FIG. 3A, each sheet fastener 153 comprises a bar and two screws.

However, each sheet can be connected to the blocks by any fastening mechanism known to a person skilled in the art, for example, but not limited to, an adhesive or a clamp. In one embodiment, the sheets and blocks can be a single structure, for example, if the sheets and blocks for a single subassembly are produced by additive manufacturing techniques, i.e., 3D printing.

Sensor subassembly 146 further comprises a bridge 162 connected to block 158, wherein bridge 162 also spans gap 159. Magnetic bar 164 is connected to bridge 162, and is positioned such that it is suitably aligned with sensor 160, but does not contact sensor 160. Accordingly, magnetic bar 164 moves with block 158, while sensor 160 moves with block 156. Therefore, the relative motion between blocks 156 and 158 can be measured by sensor 160. Thus, sensor subassembly 146 acts as a force transduction mechanism in that the amount of relative motion increases with the magnitude of an applied force, wherein sensor 160 measures this relative motion. The information related to the relative motion sensed by sensor 160 can then be transmitted to a microcontroller.

Referring again to FIG. 2, three sensor subassemblies 142, 144, and 146 are shown connected together to form sensor assembly 130, wherein each subassembly can sense movement in a single direction, and wherein the three sensor subassemblies are arranged to sense movement along all three axes (X, Y, and Z). Specifically, sensor subassembly 142 connects blocks 152 and 154 and senses motion along the X-axis; sensor subassembly 144 connects blocks 154 and 156 and senses motion along the Y-axis; and sensor subassembly 146 connects blocks 156 and 158 and senses motion along the Z-axis. In such an embodiment, block 154 is L-shaped in order to allow for the sensing of movement along any of the three axes.

As shown in FIG. 2, the individual sensor units can be connected serially. That is, when a grip is attached to the a surface on block 158, and the sensor is mounted to the micromanipulator at a surface on block 152, a force applied at the grip in the X direction, that will primarily activate the sensor subassembly at unit 142, must be transmitted through sensor subassembly units 144 and 146. The selective motion and response of these units allows them to act largely independently of each other.

Referring again to FIG. 1, in one embodiment, sensor assembly 130 can be positioned such that block 152 is connected to bracket 132 and block 158 is connected to grip 136.

That the subassemblies have a reduced rotational response to torques is also particularly advantageous because, given the small distance scales over which this device is designed to operate, and the comparatively long lever arms of tool 119 and the length of sensor assembly 130, even very small rotations could result in significant motions of the tool near sample 118. For example, if the operator applies a force to grip 136 in order to cause sensor subassembly to move tool 119 a distance of 20 microns toward sample 118 (just due to the flexion of the sensor, not the motion of the micromanipulator), this force will also create a torque at all of the subassemblies within sensor assembly 130. If the result of this torque were to produce even a very small rotation of, say, 0.01 degrees, the resulting motion through a 4 cm lever arm would be approximately 7 microns, and could cause a motion of the tool in an unintended direction, which would make the system difficult to use.

One advantage of the device of the present invention is that each of the sensor subassemblies are relatively responsive to the component of the applied force that is perpendicular to the sheets, but relatively unresponsive to torques and components of the applied force that are orthogonal to the perpendicular direction. That is, the relative motion of two paired blocks, for example, blocks 156, and 158, is primarily along only a single direction, and there is very little rotation.

An advantage of the mechanism of the sensor subassemblies presented in FIGS. 2 and 3 is that they do not require any sliding components, such as bearings or bushings. Such components can have mechanical play or a stick-slip action that can easily produce undesired motion in the device.

The sensors of the present invention are used to measure the relative motion between blocks, but in another embodiment the absolute position of the blocks can also be measured. For example, a set of three inductive position sensors can be affixed to rigid mechanical extensions that are affixed to bracket 132 (FIG. 1) so that they are held near the sides of sensor assembly 130, and positioned to detect motions in the three orthogonal directions.

As would be understood by a person skilled in the art, the arrangement of sensor subassemblies in order to sense all three axes is not limited to the embodiment shown in FIG. 2. For example, the location of sensor subassembly 144 (Y-axis) can be switched with sensor subassembly 146 (Z-axis). Further, in one embodiment, sensor assembly 130 can comprise a twos axis sensor assembly instead of the three-axis assembly shown in FIG. 2, for example in applications requiring restriction to two-axis movement. Similarly, in another embodiment, a single axis assembly can be used, wherein the sensor assembly is a single sensor subassembly.

The blocks of device of the present invention can comprise any shape, size, or composition, its would be understood by a person skilled in the art. In a preferred embodiment, the cross-sectional shape of the blocks is rectangular in shape, as shown in FIG. 2. However, the blocks can have other cross-sectional shapes, such as, but not limited to a parallelogram, or a hexagon. Accordingly, the device of the present invention can comprise any number of sheets connecting the blocks, depending on the cross-sectional shape of the blocks, and/or the desired stability and performance of the device.

Similarly, the blocks of the device of the present invention can be solid, hollow, or have openings or channels in the surface of the blocks. Further, the blocks can have varying dimensions, for example, the blocks can be wider or larger at the point where the sheets are connected to the blocks compared to other portions of the block. In addition, the blocks can have rounded or beveled edges where the sheets are attached to the blocks, for example to reduce the amount of local stress compared to sharp, right angle edges.

Figure 3B:
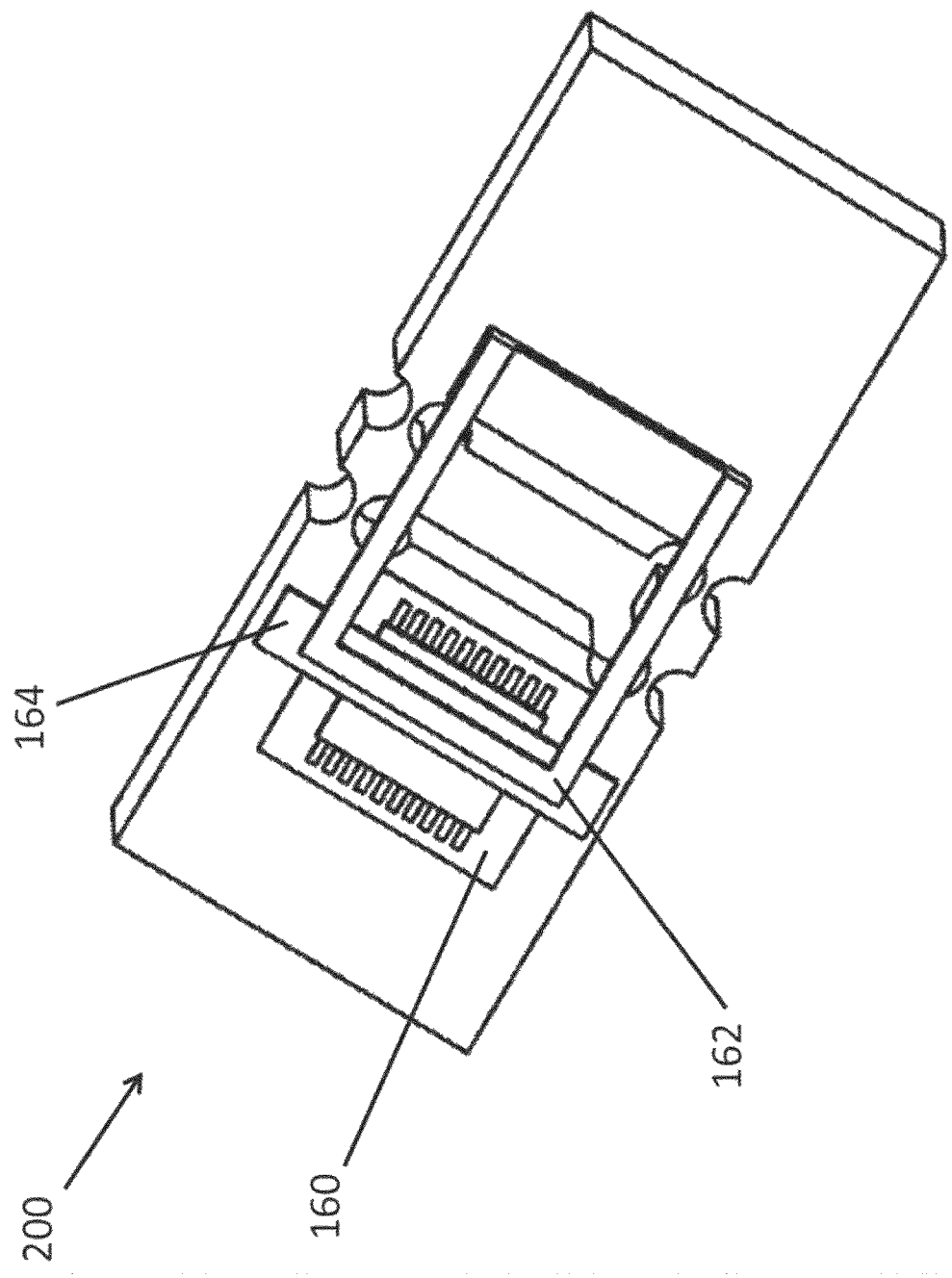

In one embodiment, the sensor subassembly comprises a sheet spring mechanism, as shown in FIG. 3A. In another embodiment, the sensor subassembly of the present invention can comprise a notch-type spring flexure mechanism 200, as shown in FIG. 3B, which can also achieve the same advantages of the sheet spring mechanism, and is assumed to be within the scope of this invention. Both mechanisms are known in the art and described in Smith and Chetwynd, Foundations of Ultraprecision Mechanism Design, Vol. 2, 1992, Gordon and Breach Science Publishers, which is hereby incorporated by reference in its entirety. The blocks of the present invention can comprise any material, for example, but not limited to aluminum, steel, or other metal, carbon fiber, or any type of polymer. In an exemplary embodiment, the dimensions of blocks 152, 156, and 158 are 0.75 inches on each side and comprise aluminum. The gap between each block is 0.2 inches. Each sheet is 0.01 inch thick and comprises stainless steel. With these dimensions and TRACKER sensors, when the operator applies a comfortable amount of force typical for delicate procedures, tool 119 will move in a range of about 0 to 500 microns, depending on the amount of force applied by the operator.

The sheets of the present invention can be any shape, size, or composition, as would be understood by a person skilled in the art. In one embodiment, the sheets are generally rectangular in shape and are sized to cover most or all of the width of the blocks of the present invention. In another embodiment, the sheets can be strips, i.e., thin rectangles than cover only a portion of the width of the blocks. In such an embodiment, multiple sheets in the form of strips can be attached to a single face of a block. The sheets of the present invention are generally flexible to allow some movement, but stiff enough to provide counterforce to prevent significant movement of the blocks and stabilize tremor from the operator.

In various embodiments, the material properties and dimensions of the sheets and the size of the gap between blocks can be modified to adjust the sensitivity and performance of the device of the present invention. Further, the sensitivity of the sensors in the sensor assembly is also a factor of determining the overall performance of the device. The dimensions and material properties of the sheets and/or gap size are generally chosen so that an ergonomically reasonable amount of force applied by the operator's hand will result in a motion of the blocks that is within the sensitivity of the sensor. For example, a smaller gap size can provide a more selective response to the force in a direction perpendicular to the sheets, rejecting other forces and torques. In one embodiment, very sensitive position sensors (e.g., capacitive or inductive sensors) can be used to enable the device to work at extremely fine scales, especially when a smaller gap size and thicker sheets are used. For example, operators with significant hand tremor, might need a stiffer device, which can be made by decreasing the gap Size and/or increasing the sheet thickness. For some uses, it may, for example, be advantageous to reduce the gap size and also reduce the thickness of the sheets. In one embodiment, the sensor subassemblies can have different characteristics. For example, a device that is stiffer along a single axis may be desired, wherein the gap size is smaller and/or the sheet thickness is larger for the sensor subassembly associated with movement along that axis, compared to the gap size and/or sheet thickness of the other two sensor subassemblies.

The various components of the present invention can comprise a variety of materials. For example, the blocks and bridge can be from a hard polymer, a composite material, or a range of metals such as brass, titanium, or steel. The sheets of the present invention are generally made from a range of materials, such as metal or polymer, so that the firm sheets are sufficiently flexible, yet strong enough to support the attached structures. However, the various components of the present invention can comprise any materials known to a skilled artisan, and are not limited to the specific materials described herein.

In various embodiments, the device of the present invention comprises a micromanipulator. In one embodiment, the micromanipulator is a 100 cr system driven with the 421 DC motors, for example from Siskiyou Design Inc. In another embodiment, the micromanipulator can be a Sutter Instruments MP-285 micromanipulator. However, the micromanipulator can be any type of micromanipulator, as would be understood a person skilled in the art. The micromanipulator is used to control some or all of the motion of grip 136. In one embodiment, the micromanipulator can move the grip via direct contact with the grip. In another embodiment, the micromanipulator can move the grip via interaction with the sensor assembly, wherein the sensor assembly connected to the grip.

In FIG. 1, sample 118 and pedestal 117 are fixed, and the micromanipulator of the present invention moves the sensor assembly 130 and grip 136. In another embodiment, the sensor assembly 130 and grip 136 can be held fixed, and pedestal 117 can be integrated with the micromanipulator, such that pedestal 117 is moved by the micromanipulator in response to forces applied to the sensor assembly 130. This approach has certain advantages, such as the dynamic forces on the micromanipulator are reduced and the tool remains in an approximately fixed position, and therefore is easier to keep in within the focus of a microscope.

In various embodiments, the device of the present invention comprises a microprocessor or microcontroller. The microprocessor can be any microprocessor suitable for processing data from the sensor assembly along with any other sensors or inputs from the device. In addition, the microprocessor can be any microprocessor suitable for controlling the micromanipulator. In one embodiment, the microprocessor can be connected to the other components of the device via wires. In another embodiment, the microprocessor can be connected to the other components wirelessly, for example via WiFi or Bluetooth.

Figure 4:
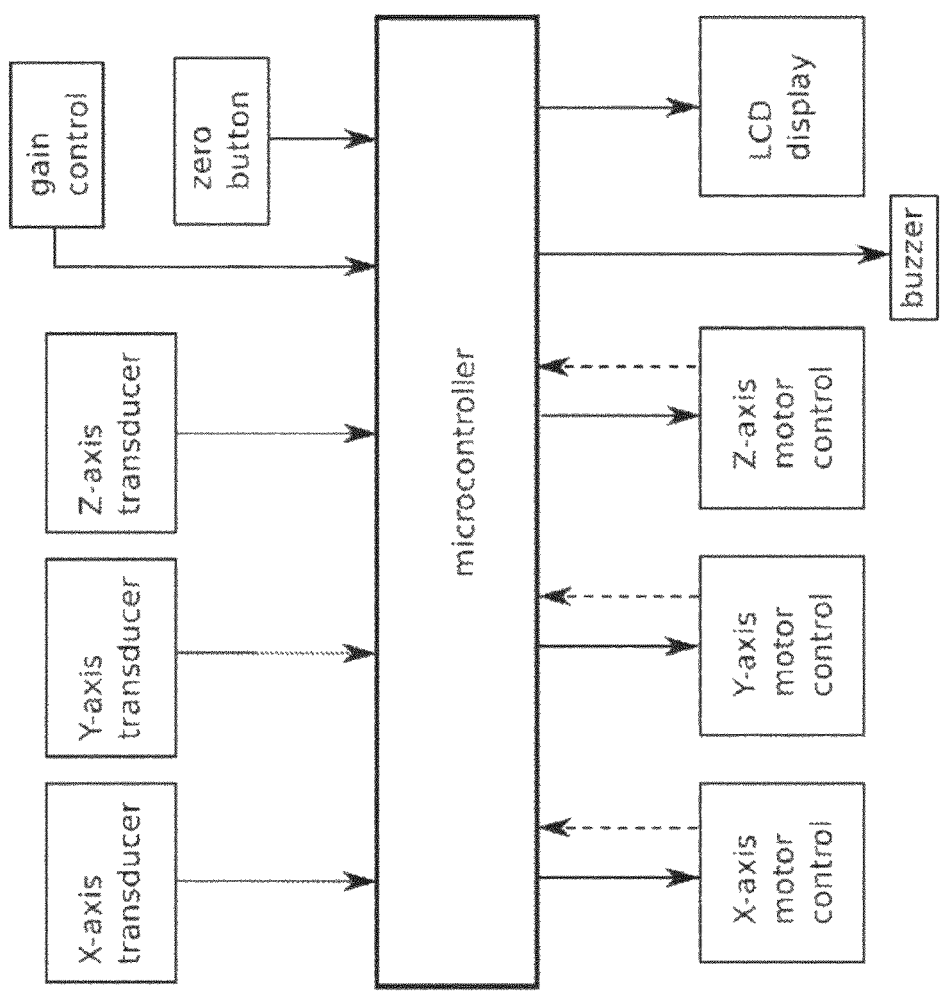
FIG. 4 is a flow chart representing the control system of an exemplary embodiment of the present invention.

The method and arrangement of wiring or connecting the various electrical components and mounting them will be well known to those with ordinary skill in the electronic and mechanical arts. The wiring paths are not shown in any of the figures nor are power supplies for any of components. FIG. 4 shows signal inputs and outputs of the microcontroller. The microcontroller receives information from the sensor assemblies, indicated as the X-, Y-, and Z-axis transducers in FIG. 4. The microcontroller may also receive other information. A gain control can be adjusted by the operator and its state is communicated to the microcontroller, and can, for example, be a potentiometer with a dial or foot pedal that is controlled by the operator. A zero button is also indicated in FIG. 4, and this button can be depressed by the operator and its state read by the microcontroller. In addition, the motors of the micromanipulator or other sensors can provide information to the microcontroller, such as travel range limits, or position measurements, as is common for closed loop control of motor motion. The microcontroller also communicates with the micromanipulator to control the motion of micromanipulator, indicated in FIG. 4 as the outputs to the X-, Y-, and Z-axis motor controls. The microcontroller also controls feedback to the user. It may drive a buzzer and a liquid crystal display (LCD), as indicated in FIG. 4, or other type of display, or it may also give feedback to the operator through controlling other indicators such as light emitting diodes, or haptic technologies. It is also possible to have the microcontroller communicate with a personal computer and use this to provide the functionality of the buttons, displays, and buzzers through a graphical user interface running on the personal computer. Other operator controlled switches and settings for the microcontroller may also be useful, such as an engage/disengage switch, that can disable the motor drive functionality of the microcontroller; or a run/adjust switch, to select between a normal use mode and a mode where the parameters to the device can be more conveniently adjusted, for example, where more information is displayed about the internal state of the device that may not be desired during normal use. A specific case for the later example is that the TRACKER sensor used in the current embodiment can provide detailed information that wouldn't normally be useful while running, for example, information useful for positioning magnet 164 relative to sensor 160.

In one embodiment, the device can be calibrated using a zero offset button. To calibrate a zero offset the operator will typically avoid touching the device while depressing the zero button. Once the zero button is depressed, the microcontroller will calculate an average of the transducer readings over a short time period. The microcontroller can store this value and use it subsequently, for example, to subtract this average from each of the ongoing transducer readings. In one embodiment, if a tool is attached to the system and the device is zeroed when the operator is not touching the device, then once the operator does begin to use the device, only the additional forces supplied by the operator will be used by the device to determine the motion. In another embodiment, the operator can zero the device while applying an approximately constant force to the device. This approach can, for example, allow for bi-directional control along any direction even with unidirectional forces, where the direction of the notion will depend on whether the force along any axis is greater or loss than the initial force applied. Zeroing can also help compensate for drift in the sensor readings or changes in static forces applied to sensor assembly, such as when tools are changed.

In one embodiment, the microcontroller can also provide visual and auditory feedback to the operator. In one embodiment, the microcontroller can activate a buzzer (see FIG. 4) when excessive deflection is measured by the transducers. In another embodiment, the microcontroller can provide visual feedback to the user via displays of lights that can indicate various information, such as, but not limited to: whether power is being supplied to the device, whether the system has been zero corrected, the zero corrected and uncorrected readings from the three transducer assemblies, or values indicating the speed of the three axes of the micromanipulator.

In various embodiments, other operator input interfaces can be used, such using voice commands to instruct the device to change gain settings, or to zero the device.

A variety of algorithms can be used by the microcontroller to control the motion of the device. In one embodiment, the output of the sensors can be scaled and multiplied by a gain, then applied to micromanipulator moving in the same direction as the sensor. Additional processing may be useful, such as, low-pass filtering to remove jitters from the operator or environment; or the operator can wear a sensor to measure heartbeat timing, since heartbeats can cause unintended hand motion, and this information can be factored into determining the response to signals from the transducers; or the output can compensate for dynamics of the motor; etc. The device can be programmed to not drive the micromanipulator for very small forces, which would, in some circumstances, cause the device to be slightly less responsive. The microcontroller can also be programmed to respond to rapid changes in force as reported by the transducers, or respond to an additional sensor measurement, such as the force that the tool is applying to the object, or the temperature of the object, etc.

Although the sensor subassemblies respond primarily to forces perpendicular to the sheets, they can also respond undesirably to forces orthogonal to the perpendicular direction to the sheets. This mixing of forces can be corrected using standard mathematical techniques in the programming of the microcontroller. In addition, the axes of the sensor assembly and micromanipulator do not need to be aligned, as a simple coordinate rotation can be performed using standard mathematical methods. Further, the sensor assembly units are not required to be orthogonal.

This device may also be useful for drilling through a tough material directly abutted against a softer material, such as in the case of drilling though a cranium, with the brain located immediately below. In this situation, when drilling freehand, it is common to apply force to the drill to promote movement through the tough material, and then fail to remove this force quickly enough when entering the softer material. In this situation, the primary problem is that the speed through the material is determined by a combination of the force applied by the operator of the drill and the type of material, so that when the softer material is entered, the drill moves very quickly. If, instead, the device of the current invention was used to move the drill through the material, even when controlled by an operator's hand, the maximum speed can be limited to the speed range that would be useful when moving through the tougher material, so that the drill would not move substantially faster when moving through the softer material, and thus give the operator more time to respond to entering the softer material. This technique would allow the operator to use the precision control of this device for accurate positioning and control of the drill, as well as allow drilling with reduced penetration below the tougher material. For such applications, it may in some circumstances be advantageous to use a combination of parameters for gap 159 and the thickness of sheets 166 so that the force on the drill required to drill through the tougher material does not flex the sheets more than the penetration tolerance into the softer material, since once the drill penetrates through the harder material, and therefore meets less resistance force, it will move to increase the flexion of the sheets and penetrate this distance into the softer material.

An alternative method for using this device to drill through a tough material directly abutted against a softer material, is to use sensor assembly 130 as a force sensor to measure the resistance to forward motion, as an aid in determining whether the drill has penetrated the harder material. In the normal mode, the device uses forces from the operator's hand to guide the motion of the tool. This mode can be used, for example, when a small drill, such as a dental drill, is being used for tool 119, and the tip of the drill can be placed directly above the area to be drilled. At this point, the operator can release their hand from the grip and indicate to the microcontroller, for example, by pushing a button, that the drill was in place. With the operator's hand removed from the grip, the primary changes in the force applied to the sensor will be due to changes in the forces on the drill, and, in this way, the sensor can be used to sense the forces on the drill. If the micromanipulators advance the drill through the bone at approximately constant speed, the resistance to forward motion will change between when the drill is advancing through the bone and when it penetrates through to the other side of the bone. This change in force can then be used as a cue to the microcontroller to stop the forward motion of the drill, and, optionally, retract it from the hole. The deflection of the force sensor can also be used to control the speed of motion though the material, for example, if the resistance force to forward, motion became too large, the speed of advancement can be reduced. An alternative method for testing for penetration though the bone is to observe the change in force on a no drill by using the following cycle: the drill can be turned on to full speed and advanced a small distance through the material; then the drill can be turned off or slowed, and while in this state, the drill can be advanced slightly further to probe the resistance of the material (for example, 20 microns); whether penetration has occurred can be determined by observing the resistance of the material, and if penetration is not observed, the cycle can be repeated. This method can be useful in cases where the change in force on a drill spinning at constant speed was insufficient to determine penetration. An advantage of using this device for this application is that it can be guided into position using the hand-guided accuracy available with this device, and the grip can then be released and the drifting process started, all very quickly and easily.

In one embodiment, the position or movement of the micromanipulator or tool 119 can be used by the microcontroller, and this would allow for many options for the device. (This can be done, for example, by using a repeatable motor drive, or by using encoders on the micromanipulator—a possible communication channel is shown as dashed lines in FIG. 4, or for optical measurement of the position of the tool tip). For example, the motion of tool 119 can be restricted to have reduced dimensionality, such as moving only in a plane or line; or boundaries can be put on the motion, for example, to prevent damage to nearby equipment, like a microscope lens. Furthermore, the motion can be guided by input from the operator referencing the sample 118: for example, the operator can guide tool 119 to two different points, and press a button at each point to indicate to the microcontroller that the point is selected, and then the microcontroller can restrict the motion of the micromanipulator to only allow the tool to move along a line through these points. Or, this can be externally referenced, for example, if the microscope that the operator was using (not shown) was equipped with an encoder on the focus adjustment, the operator can focus the microscope on the tool and then refocus on the object, the microcontroller can record this difference in focus locations, and then automatically move the tool to be close to the object (this process is often difficult for beginners).

Another application for this device, in which the microcontroller uses information about the position of the micromanipulator or tool, is in drilling through a surface in a pattern of small holes. For example, if tool 119 is a small drill that can be used to cut a hole larger than the diameter of the drill bit into bone, as is commonly done to access parts of the mouse brain in in vivo preparations. Here, once the mouse cranium is exposed, the operator can guide the drill point to touch three locations on the cranium that lie on the perimeter of the desired hole, and the microcontroller can read the positions of these three points. Software can use the three points to determine the desired circle (including the orientation of the plane in which the circle lies). The operator can then remove his hand from the device and the drilling of each hole around the pattern can proceed, and each hole can be drilled with the device by sensing of forces on the drill to stop penetration once beyond the cranium thickness (as described above). Many holes can be drilled around the perimeter of the circle, each one starting slightly above the circle, and then the device can move quickly until the drill tip contacted the cranium (as determined by the force of the drill contacting the cranium); if not already spinning, the drill can start spinning once contact is made; the drill can then advance through the bone until the force changes on the sensor indicated that the drill was through the bone; the drill can then be retracted back through the hole; and advanced to the next hole. Similarly, holes of arbitrary shapes can be created by hand-guiding a trace of the desired hole perimeter on the surface of the cranium, these positions can be stored in the microcontroller, and the grip released to automatically drill the required pattern to create the traced hole. An alternate approach to drilling a sequence of small holes around the perimeter is to move the cutter along the perimeter, possibly making multiple passes around the perimeter, while also monitoring the resistance force in the direction that would indicate breakthrough to the softer material, in order to avoid cutting into the softer material, and simultaneously measuring force along the perimeter of the cut to control cut speed and force. An advantage of this device is that it encompasses a system to precisely position the drill, and then drill the hole; and for a pattern of holes, such as required to cut the perimeter of a larger hole, the shape of the larger hole can be directly indicated with this device, and then required pattern of holes can be drilled to release the larger hole.

The present invention can include other components. For example, rotating joints, sensors to indicate joint angle, and a spring to keep the structure rigid enough to provide stability to the operator can be used. A motion stop mechanism can be added to the sensor subassemblies to limit extreme and/or possibly damaging deflections. For example, referring to FIG. 3A, the motion stop mechanism can comprise a rod inserted into openings in blocks 156 and 158, wherein the rod spans gap 159. The openings can be sized to be slightly larger than the width of the rod. An undesirably large movement would force the rod to contact the sale of one of the openings, thereby limiting the motion of the blocks. The device may also comprise strain gauges attached, for example, to the sheets of the sensor assembly.

Other mechanisms of a motor driven stabilizing sensor are also possible, such as using long rigid rods with the tool and grip assembly at one end and a semi-rigid mounting structure at the other. For example, a piece of straight tubing can be attached to one of the blocks of a single sensor unit and mounted so that the axis of the rod is perpendicular to the sheets, and a tool holder can attached to the other end of the rod. Strain gauges can be attached to the rod to measure its bending. In this configuration, the strain gauges can measure forces in the two directions perpendicular to the axis of the rod and the sensor unit can measure forces parallel to the axis of the rod, so, effectively, the flexing of the rod and the measurements of this flexing by the strain gauges can eliminate the need for two of the three sensor units. In this configuration, the rod can also twist around its axis due to the applied torques, and dimensions should be chosen so to keep this within an acceptable range for each application.

In various embodiments, the grip of the present invention can comprise additional components, and can be made ma wide variety of designs and form factors. Referring to again to FIG. 1, many different grips and tool mounting systems are possible with this device, and grip 136 and tool assembly 134 shows a particular embodiment to demonstrate a possible use case for this device. Grip 136 forms a grip that is held between two of the operator's fingers. A truncated sphere that is attractive to magnets and mounted to a platform and magnetic ring is placed on the sphere. Tool 119 has a sufficient degree of attraction to the magnet that it is conveniently held in place on the magnetic ring and may also be opened and closed by the operator's thumb. The magnetic ring can be repositioned on the sphere to change the angle of the tool. An alternate arrangement is to make grip 136 so that it can be comfortably held between the thumb and middle finger, and tool 119 can be operated by the index finger. An additional alternate arrangement is for the operator to hold tool 119 between the thumb and index finger and for tool 119 not to be in contact with other parts of grip 136 or tool assembly 134. Many other designs for the grip and tool holder are possible, having different ergonomics, holding different tools, and providing different degrees of freedom.

Figure 5:
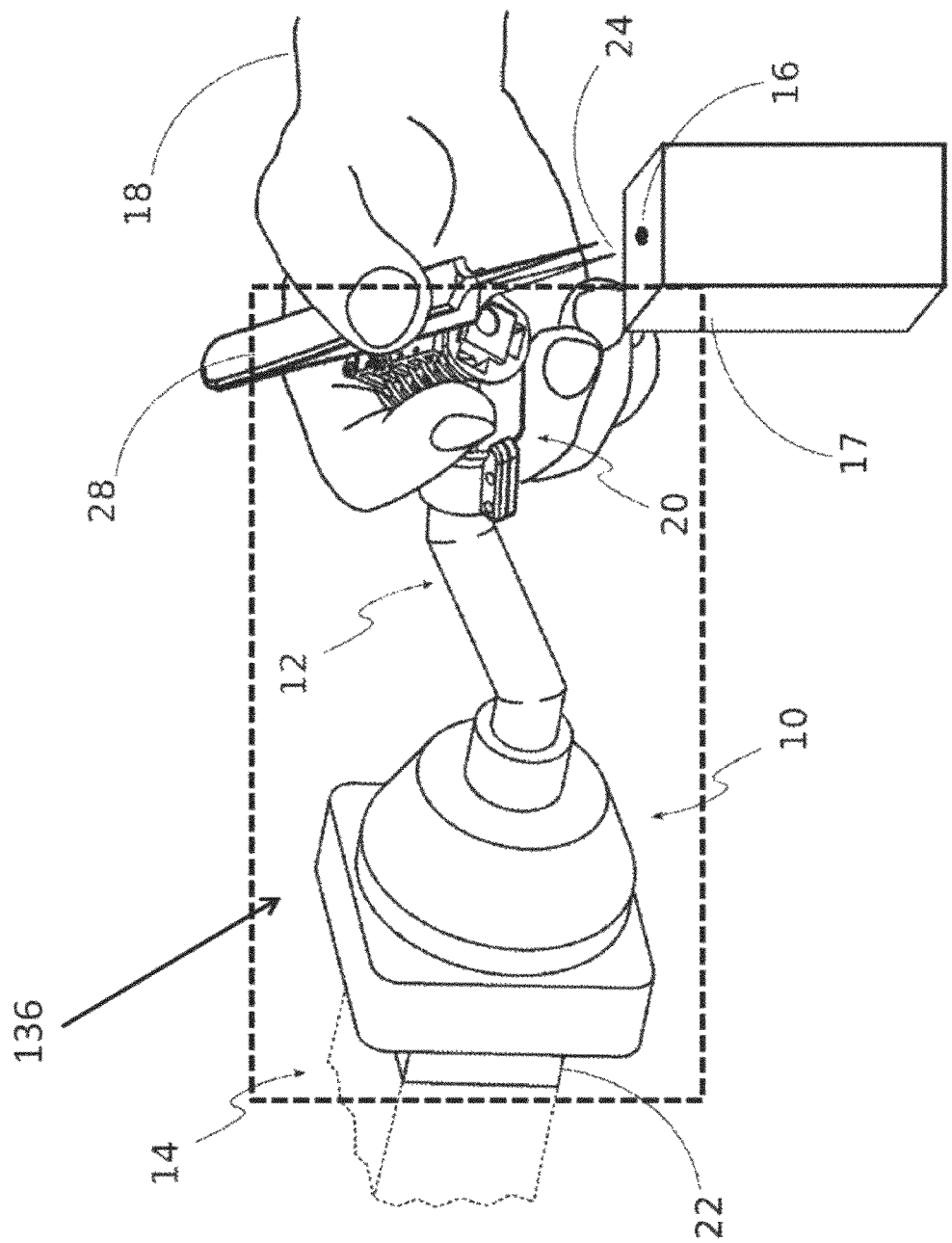
FIG. 5 is a schematic diagram of an exemplar y embodiment of a tool holder and grip of the present invention with a rotational arm.

In another embodiment, grip 136 comprises a fixed point tool holder designed to allow a rotation of the tool while keeping a point fixed in relation to the tool, also fixed in space. Once rotated, the holder will also keep the tool stable enough to do precision work, even while the operator's hand is on the grip. A schematic diagram of such an embodiment is shown in FIG. 5. Grip 136 comprises three general components that further include various subcomponents. The general components are: a rotational housing 10, which has a rigid mount point 22, to a support 14; a tube 12 which extends from rotational housing 10; and a combined grip 34 and tool bolder 32 (see FIG. 6) which attaches to tube 12. Rotational housing 10 is fixed in relation to support 14, but has an internal locking mechanism which can be remotely controlled by the operator to allow tube 12 to rotate or be locked rigidly in place.

Referring again to FIG. 5, grip 136 is designed to be mounted to a support, here shown as support 14. In one embodiment, support 14 can be block 158 in FIG. 2, i.e., the tool holder and rotational device described in this section can be adapted or connected to sensor assembly 130 described previously herein. In another example, sensor assembly 130 can be located in base 120, or can be mounted to some other structure, wherein the embodiment of grip 136 shown in FIG. 5 is mechanically connected to sensor assembly 130. In such an example, grip 136 can be connected to block 158 of sensor assembly 130 via mount point 22. However, in various embodiments, support 14 can be any structure that is further connected to sensor assembly 130 and can communicate directive force to sensor assembly 130.

Referring to both FIGS. 5 and 6, the operator's hand 18, holds the grip 34. From this grip 34 the operator can operate tool 28 (here illustrated as forceps, but any of a range of tools can be used), and also, when tube 12 is locked in place, provide directive force on grip 34 which is mechanically transmitted through grip 34, to tube 12, to rotational housing 10, to support 14. Support 14 can sense the directive force and move in a direction consistent with the directive force. Pedestal 17 holds object 16, and these are not part of the invention but shown only for illustration. This explanation is not intended to limit the scope of use for this invention, but provide usage example showing a circumstance in which it would be useful to have a device, such as this one, which allows rotation of a tool, but not direct translation; that is, this device allows for rotation of a tool, whereas the support allows for translation.

Figure 6A:
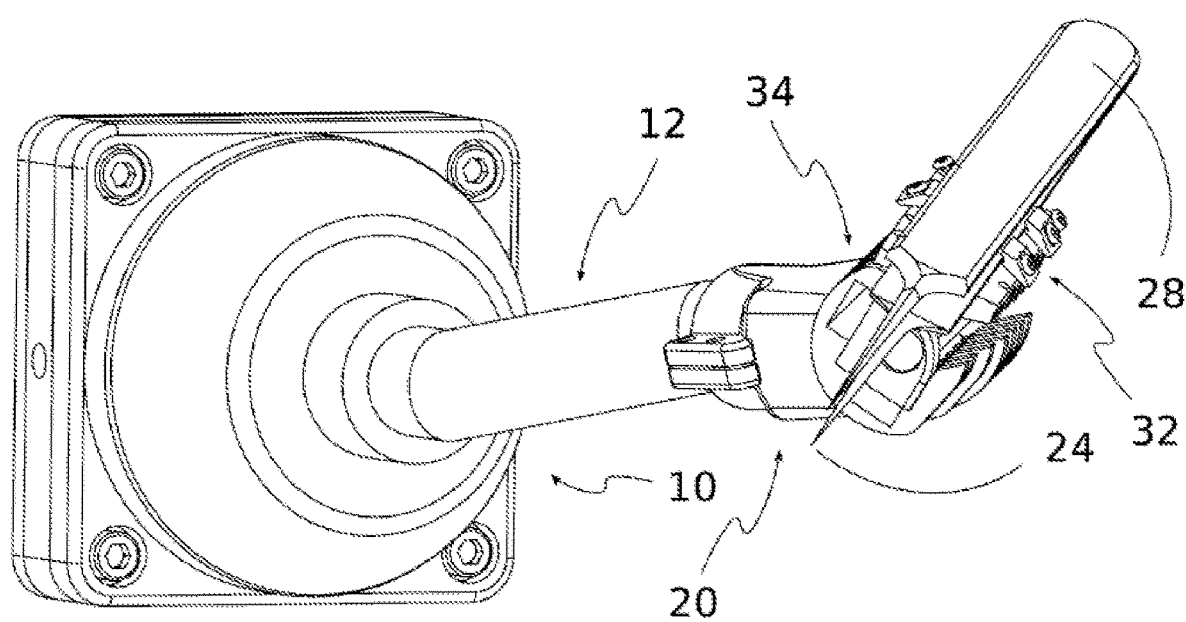
FIGS. 6A, 6B, and 6C depict a series of schematic diagrams of an exemplary embodiment of a tool holder and grip in various states of rotation.
Figure 6B:
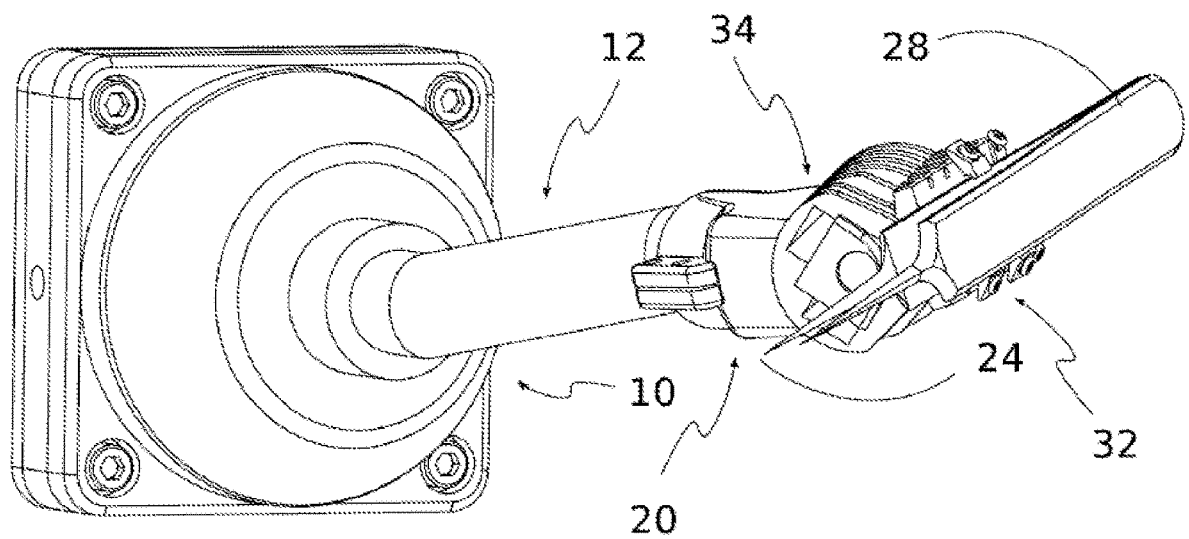
Figure 6C:
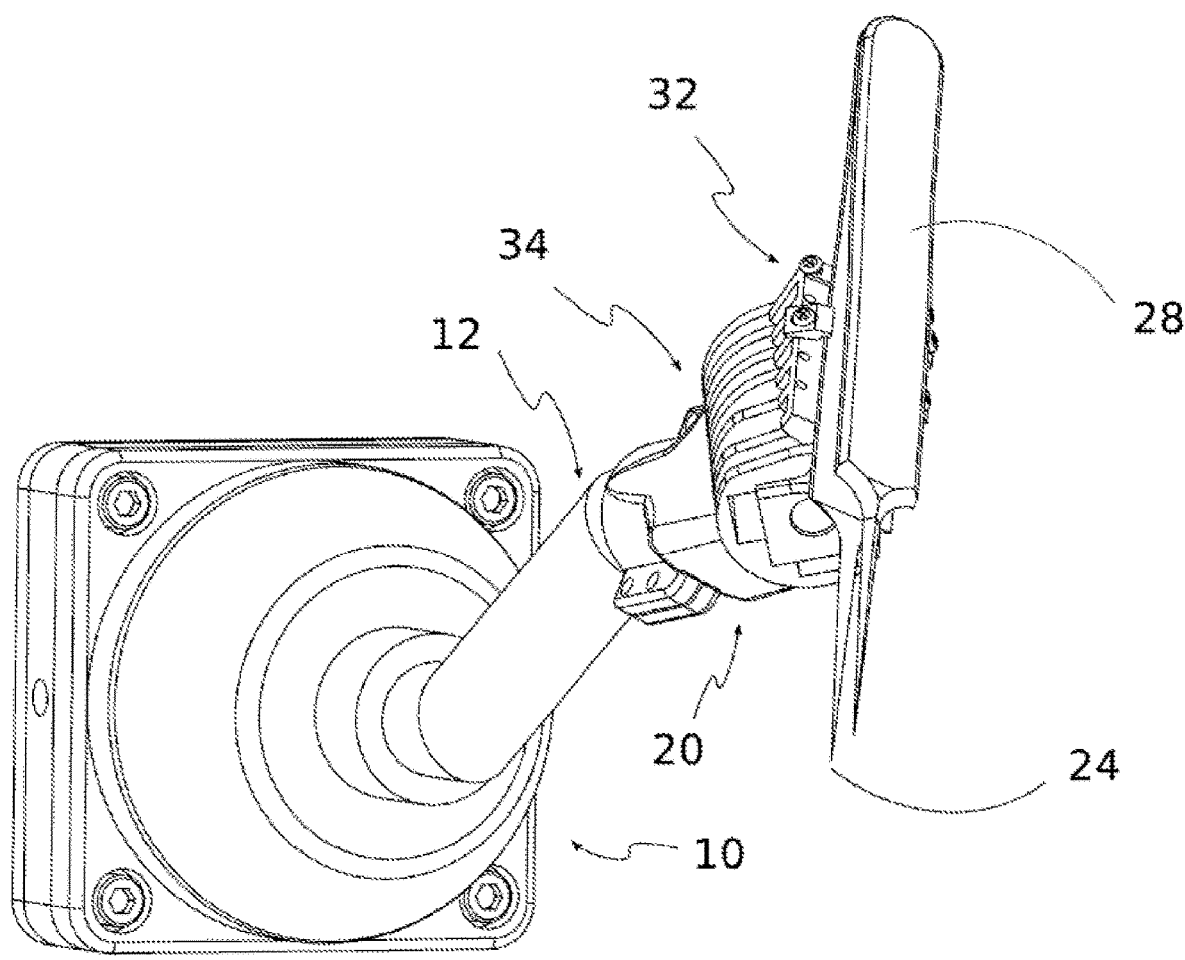

The goals of this device are as follows: 1) allow tool 28 to be rotated about one or more axes; 2) during rotation, keep tool tip 24 so that it has very little translation relative to support 14; 3) after rotation, allow all parts inclusively between grip 34 and mount point 22 to be locked sufficiently rigidly in position so that the operator's hand does not create excessive motion of tool tip 24 due to independent motion of these components; 4) allow tool holder 32 to rotate under forces applied directly to it or to tool 28, but configured so that forces applied to grip 34 do not cause rotation of tool holder 32. An example of several possible rotations are shown in FIG. 6, where for each rotation, tool tip 24 remains in approximately the same position relative to rotational housing 10. From the starting position shown in FIG. 6A, tool holder 32 rotates relative to grip 34, therefore also moving attached tool 28, to give the view in FIG. 6B; and in FIG. 6C, tube 12 rotates relative to rotational housing 10, therefore also moving grip 34 and tool holder 32. Translation of tool tip 24 can be reduced during rotation of the tool if tool tip 24 is close to the axis of rotation, whether for one or more axes. A feature of the device and its variations discussed here is to align tool tip 24 so it is on or near the axes of rotation.

Figure 7:
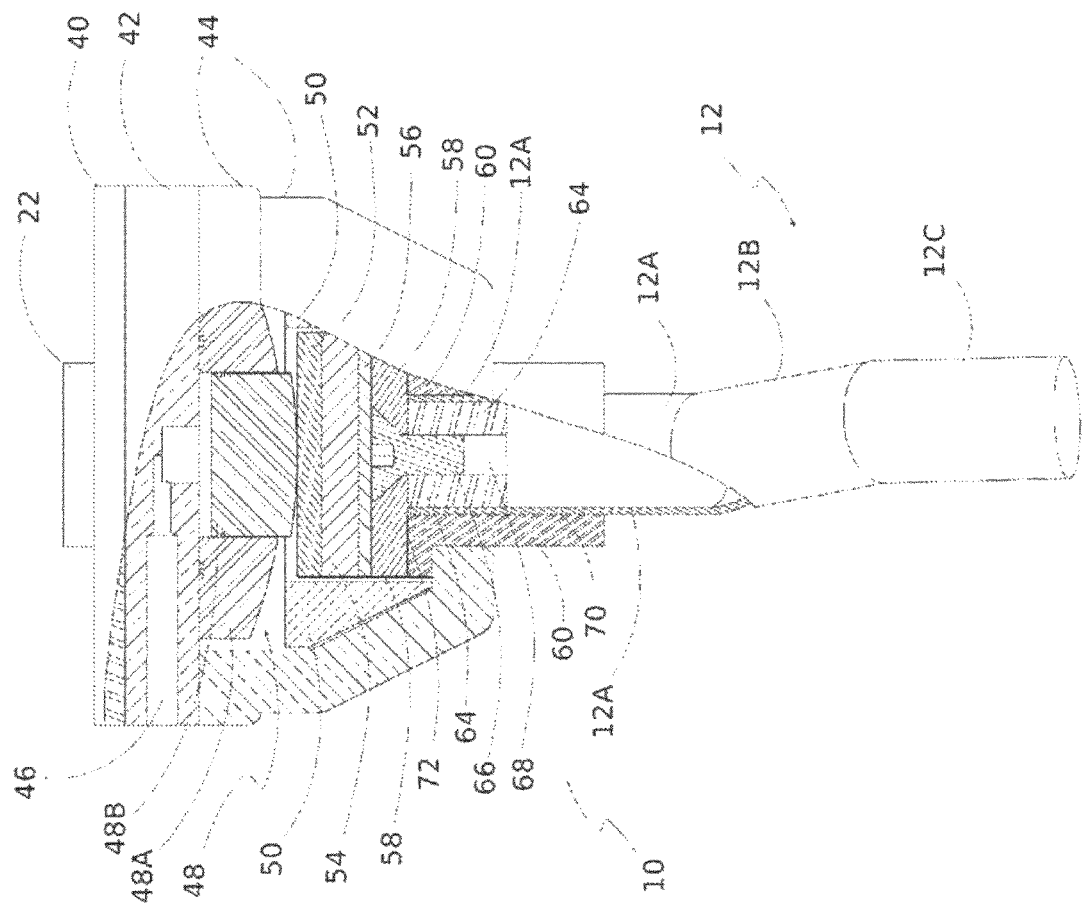
FIG. 7 is a schematic diagram of the cross-section of a portion of a rotational tool holder and grip of the present invention.

FIG. 7 the shows a detailed view of rotational housing 10 and tube 12, with a broken-out section. All structures in FIG. 7 are made out of metal, such as aluminum, brass, or stainless steel, except where noted. Part 48 is a standard pneumatic piston (purchased from Mac Corporation) and is only shown here in detail sufficient to explain its usage in this device. Annulus 48A of pneumatic piston 48 is bolted to plate 42, creating a pneumatic seal. Hole 46 feeds through to pressurize the area under piston 48B, forcing piston 48B in a direction away from plate 42. Hole 46 is connected to a source of operator controlled pressure gas, and is connected using standard techniques. The pressurized gas forces piston 48B into disk 52, which is a rigid disk to aid in distributing the pressure onto disk 54. Disk 54 is an elastic material, with a piece of stiff rubber, or, for example, a spring washer. Disk 54 aids in keeping the force between the plates equal to the force from the pressurized gas on the piston. Disk 56 is a low friction material that can slip against annulus 58, allowing annulus 58 to rotate more easily. Plug 64 has a threaded hole 68 to receive screw 66, and plug 64 is also rigidly attached to tube 12A (the first segment of tube 12); in the present embodiment plug 64 is made from brass and is silver soldered into tubing 12A, which is made from stainless steel. Annulus 58 also presses against bushing 60, and bushing 60 presses against housing 44. Housing 44 is rigidly bolted to plate 42; plate 42 is rigidly bolted to plate 40, and plate 40 is integral with mounting point 22. Disks 52, 54, and 56 are not attached to anything but are only held in place by the force from piston 48B. Retaining ring 50 encircles these three disks to keep them aligned when the piston is retracted. In the present embodiment, tube segments 12A, 12B, and 12C are made from stainless steel and are welded together to form tube 12.

Rotational housing 10 and tubing 12 can be used in the following way. Bolt 66 forces annulus 58 against plug 64, which therefore makes the assembly of parts 12, 64, 58, and 66, form a rigid body. Removing bolt 66 from plug 64 allows tube 12A to be pulled out of bushing 60, and therefore tube 12 can be exchanged. When fully assembled, as shown in FIG. 7, force from piston 48B is transmitted through the series of disks to force annulus 58 against the flat surface 72 bushing 60, and then bushing 60 against housing 44. The pressure on piston 48B can be varied to allow the rod to rotate smoothly at lower pressures, or lock it in place when higher gas pressures are applied. When the gas pressure on piston 48B is low enough to allow the piston to rotate, tube 12 can also tilt when sufficient force is applied by the operator, but this tilt is reduced by the close fit of the bored surface 70 of bushing 60. As the gas pressure becomes higher, the force stopping tube 12 from tilting comes from the pressure against flat surface 72 of bushing 60. This feature of this device allows for more stability in tool tip 24 than can be had by the fit of the bushing alone. Overall, rotational housing 10 allows tube 12 to be rotated with an amount of friction that can be set by the operator, only a small amount of tilt of tube 12 during rotation due the close lit of the bushing, and higher stability of tube 12 in the locked position than can easily be attained by the bushing fit alone.

An alternative embodiment of rotational housing 10 is to have a slot on a side of housing 44 so that subassemblies comprising tube 12, bushing 60, plug 64, annulus 58, and bolt 66, can be easily exchanged through the side slot.

Figure 8:
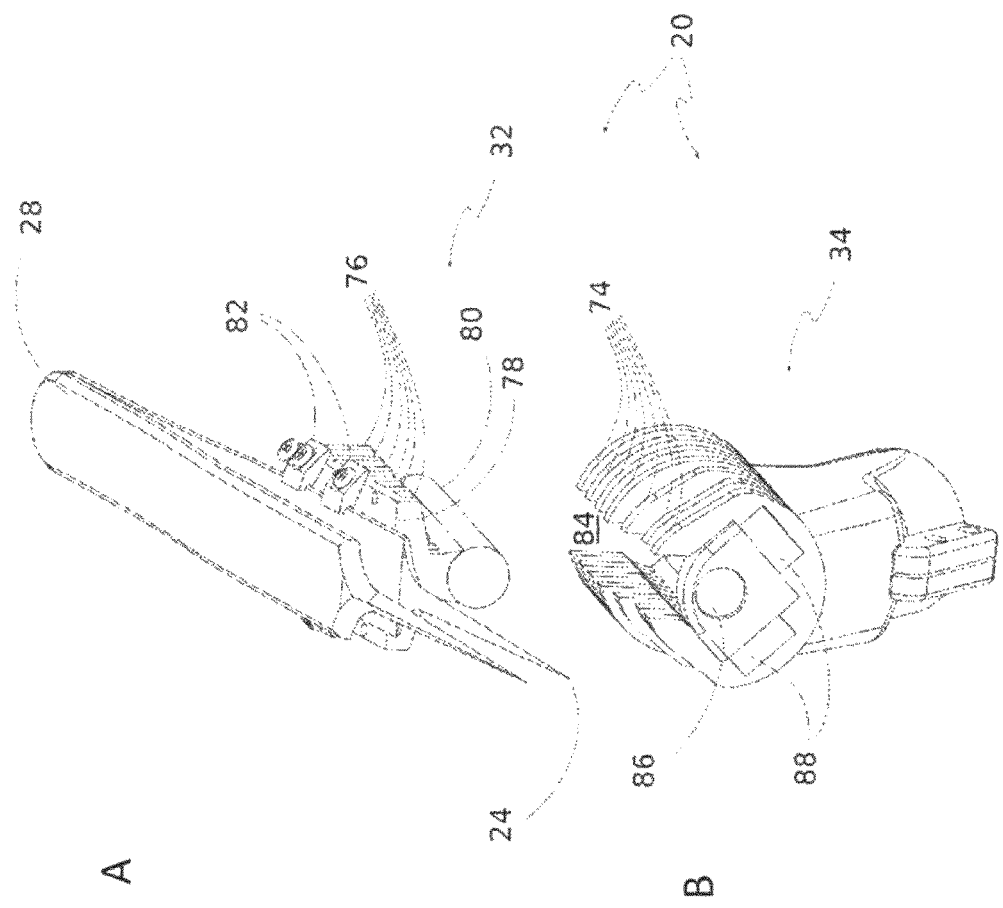
FIG. 8, comprising

FIG. 8 shows grip and tool holder 20, where its two main components, grip 34 and tool holder 32, are separated. These are intended to be easily separated and reassembled together. To reassemble, rod 80 is set into opening 84, and to disassemble, they are simply pulled apart. Rod 80 is made of a material that will be attracted to magnets, and there are several magnets in grip 34, where in this view, only magnet 86 is visible. Magnet 86 is inset into a receiving cup so that when assembled, it is held close, but so that it does not touch rod 80. Other magnets are inserted into channels 88, which run the length of grip 34. Tool 28 is held onto platform 78 with clips 82, and adjust the position of tool 28 on platform 78 can be useful during alignment. Platform 78 is supported above rod 80 by a set of evenly spaced parallel plates 76. When assembled, the tool holder's parallel plates 76 interleave with the grip's parallel plates 74, and are designed so that when assembled, tool holder 32 can freely rotate about the axis of rod 80 by more than 90 degrees. The interleaved nature of plates 74 and 76 provides a comfortable interface for the operator's hand 18, since the finger can hold these structures at any angle of rotation.

Figure 9:
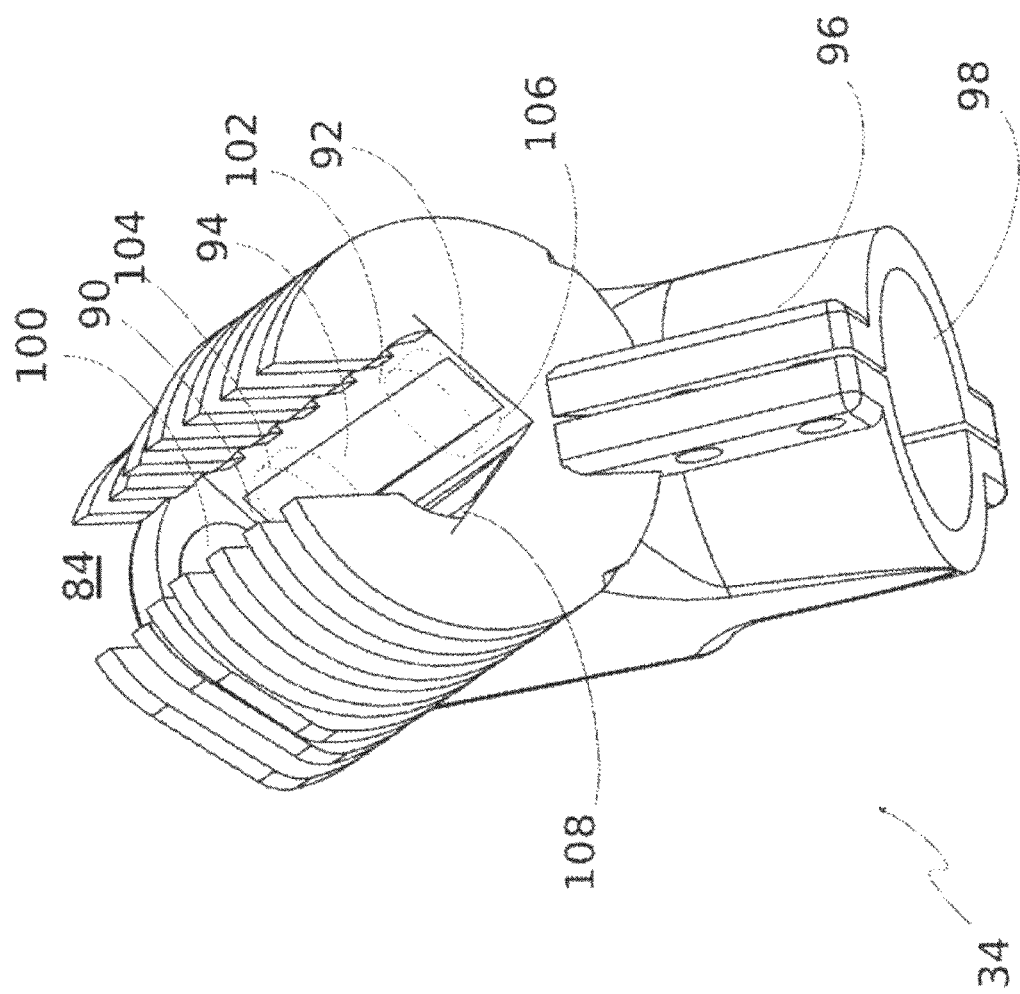
FIG. 9 is another schematic diagram of an exemplary embodiment of a grip of the present invention.

FIG. 9 shows another view of grip 34, and shows more details of the seat for rod 80. Patch 100 shows the other side of the hole for magnet 86. Two other magnets, 104 and 106, are located just below surface 102. Surface 102 is flat except for a shallow recess 94, which runs almost the full length of channel 84 but stops just before the ends, leaving two small ridges 90 and 92 at either end of the channel. These ridges support the ends of rod 80. Grip 34 is bilaterally symmetric, where surface 108 is the mirror image of surface 102, and all of features 90, 104, 94, 102, 92, and 106 are duplicated in mirror symmetry. In the present embodiment, grip 34 is manufactured from plastic by a 3D printer with magnets inserted after printing.

Figure 10:
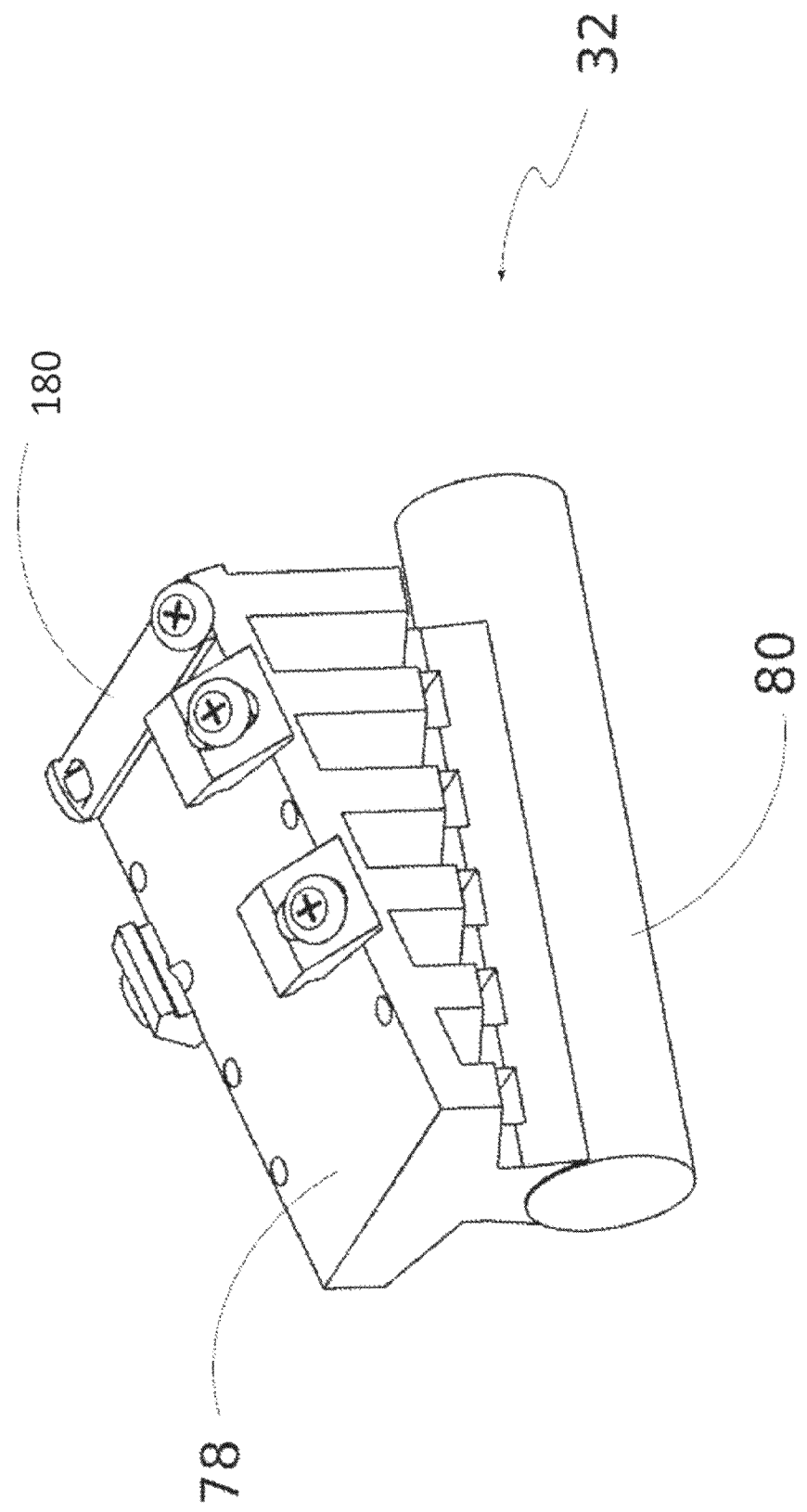
FIG. 10 is a schematic diagram of an exemplary embodiment of a tool holder.

FIG. 10 shows a view of tool holder 32 without tool 28. Shim 180 will lift tool 28 further off the end of platform 78. This is a useful adjustment as it tips tool tip 24 forward, which can be useful to set the distance of tool tip 24 from the rotational axis of rod 80. Other adjustment mechanisms are clearly possible, such as set screws to lift a portion of tool 28. Furthermore, the angle of platform 78 can be different for different tool holders, tools, and operator preferences.

A feature of the design of the grip 34 and tool holder 32 is that tool tip 24 can be aligned so that it is located on or near the axis of rod 80. When seated in grip 34, rod 80 will be held so that it can rotate about its axis, and will be held in place by magnets, 86, 104, 106, and the symmetric pair of magnets to 104 and 106. The force of those magnets can be selected so that tool bolder 32 can be easily rotated with the fingers or thumb but stays in place when not intentionally rotated.

Figure 11:
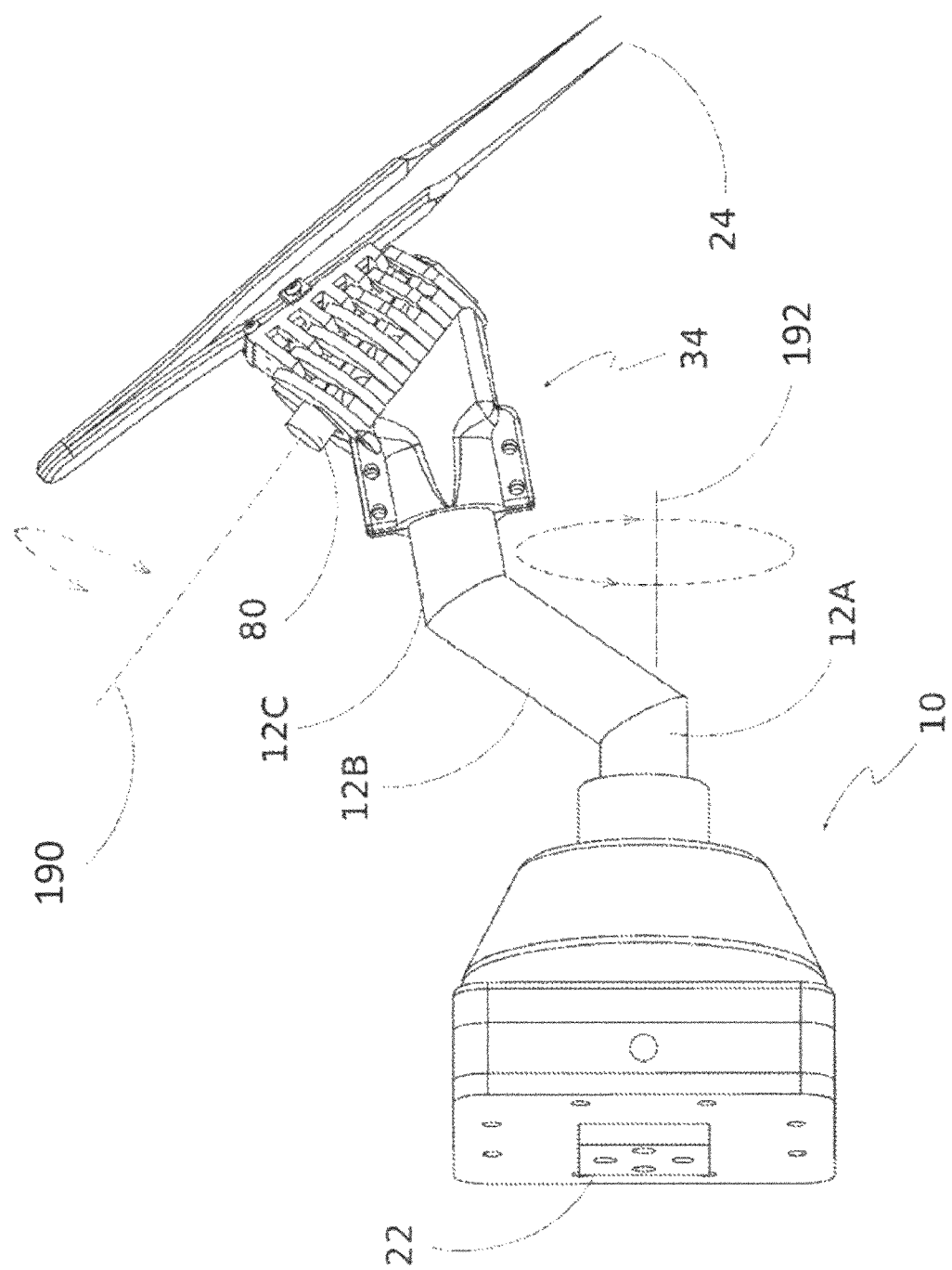
FIG. 11 is a schematic diagram of an exemplary embodiment of a tool holder and grip of the present invention.

Grip 34 is assembled to tube 12 by inserting tube segment 12C into hole 98, and a nut and bolt can be used with flange 96 to firmly secure this attachment. The assembled arrangement is shown in FIG. 11 which also shows the resulting axes of rotation, axis 190 for rotation about rod 80 and axis 192 for rotation of the tubing in rotational housing 10, which rotates with the cylindrical axis of tube segment 12A. Combining these rotations can give the configurations shown in FIG. 6, and many more. For tool tip 24 to not translate during these rotations, tool tip 24 must be on both axes. This can be adjusted as already described. An additional adjustment is possible if axis 192 is not parallel to the cylindrical axis of tube segment 12C, so it is useful to have these two axis non-parallel, since in this case, the distance from tool tip 24 will be changed as the grip 34 is slid a bit further on or off tube segment 12C.

An advantage of current design is that the grip 34 and tool holder 32 allow for very precise rotational control of tool tip 24. Effectively, the operator can gently push the tool holder 32 or tool 28 over an approximate 0.75 inches of travel to cause a 90 degree rotation of tool 28 (and tool tip 24). This generally found to be more controlled and smooth than making a similar rotation free hand.

Another advantage of the current design is that translation of the tool can be directed independently from rotation of the tool. This independence is implemented in several ways. In normal usage, translational directive force is applied to grip 34. This force will not cause rotation about axis 190 because it results in no net torque about this axis, so it does not cause tool holder 32 or tool 28 to rotate. Directive translational forces applied to grip 34 will create a net torque about axis 192, but when rotation of tube 12 is locked by structure 10, no rotation will result. Combining these two approaches significantly decouples directive translational forces from causing rotations.

For performing rotations when the tool tip (or other parts of the device) is near critical areas, it is possible to translate the tool so it is sufficiently clear of the sample, rotate the tool, and return the tool tip to its original position close to the sample. This is sometimes necessary since although this system is designed so that directive translational forces lead to a reduced level of unwanted rotations, forces directed at causing a rotation, either of about axis 192 or about axis 190, may result in translational forces acting on the sensor 130, and even when the gain is set to zero so the micromanipulators do not move, this can result in some translation of the tool due to flexion of the sensor assembly 130. This is typically negligible for rotation about axis 190, but can be more significant for rotation about axis 192, where the amount of resulting translational motion depends on details of the particular embodiment, such flexion of the sheets 166 and fiction between the moving elements.

An additional possibility for grip 34 and tool holder 32 is for tool tip 24 to be intentionally unaligned with the rotational axis of rod 80. Specifically, many suture needles approximately form an arc of a circle, call this circle C. If the alignment of tool tip 24 were adjusted so that when tool 28 was holding a suture needle, the cylindrical axis of rod 80, was approximately passing through the center of circle C, and perpendicular to plane of circle C, and so that the arc of the suture needle was coincident with circle C, then as tool 28 was rotated in grip 34, then the suture needle will follow through a single path, and, in particular, through the hole in the tissue created by the tip of the needle, and this would be beneficial in various circumstances.

Tube 12 is composed of sections 12A, 12B, and 12C. The particular shape of this can be varied and is primarily designed around comfort for the operator. The number of segments is variable, though at least two are required: one (12A) to establish the axis and the other to move the connection point for grip 34 away from the axis of 12A. Many more segments and bends can be included.

Other configurations of this design are possible. For example, the system can be designed around using an electromagnet instead of pneumatic piston 48. The basic premise of the tool holder is for it to rotate around a specific axis, such that the tip of the tool is aligned to be on, or near, said axis, and this feature can also be implemented in a variety of ways. The device can also include a semicircular track, where a grip or extended tool holder were constrained to remain in this track, thus establishing an axis where the tool tip to be located. These other approaches are considered to be within the scope of this invention.

The device of the present invention has many advantages over devices known in the art. One advantage of the device of the present invention is that controlled motion that is more precise than the accuracy of the sensors is possible, depending on the chosen parameters of the construction and the operator using the device. For instance, when the sensor assembly 130 is built to be very stiff, for example, by making the sheets thick, or the gap size small, so that a large force, applied by the operator just reaches the threshold to produce a non-zero reading from sensor 160. In this case, smaller forces applied by the operator will still cause motion, and, for example, move a tool due to the flexion of the sheets, but these motions will be smaller than the precision of sensor 160, so the motors will not be engaged. In this way, it can be possible to achieve finer motion control than would normally be allowed by the precision of sensor 160. In a more typical use case, the stiffness of the system would be chosen so that a small, rather than large, force from the operator would be required to reach the threshold of the sensor, but yet even smaller forces would still produce motion due to flexion that would be below the threshold of the sensor. Furthermore, this motion can be very natural for the user, in that when forces below the threshold level of sensor are applied, the support and tool will move a small amount due to flexion of the sheets, and larger forces will include a generally larger displacement due to flexion sheets, plus motion due to movements of the micromanipulators, making it possible to achieve a continuous, smooth, and natural-feeling user experience. In addition, the motion due to flexion of the sheets is immediate, responsive, and has a natural feel, with no time delay, both in the cases where the motors are engaged, and when they are not, and this adds significantly to the responsiveness and intuitive feel of the device.

Another advantage of the device of the present invention is for precision motion control, where because the operators hand is stabilized, the device requires less, and possibly no, algorithmic manipulation of the measured forces from the operator in order to reduce undesired motion. That is, an alternate approach for using hand motion to guide precision robotic systems is to apply algorithms to free hand motion that, for example, scale or filter the measured motion in order to reduce the unwanted motion. In some situations, this scaling and/or filtering can have unwanted effects.

Another advantage of the device of the current invention is that when the rotation of tube 12 is locked, the device has no moving parts, and in particular no rotating parts, between the mount point 22 and grip 34. Forces are applied at grip 34 and any moving parts between grip 34 and micromanipulators 120 are a potential source of mechanical play that can reduce overall stability. In particular, since the distance from micromanipulators 120 and tool tip 24 can be many centimeters, this distance can be thousands of times larger than the acceptable error in the position of the tool tip, and can function as a lever-arm through which even small amounts of undesired rotation can act to create large motions of the tool tip. In practice, this device allows for easy and precise positioning and control of tools to accuracies below 10 microns, which is more precise than other devices by approximately a factor of ten.

Another advantage of the device of the current invention is that it reduces control difficulties that can be caused by rotational degrees of freedom. These difficulties arise because, for very precise motions, the tool length can be thousands of times the acceptable error in the position of the tool tip, which leads to rotations being deleterious and hard to control. An example, for illustration purposes, is to consider a 90 degree rotation of a 10 cm tool, where the tip is required to stay within a 15 micron tolerance, and no restrictions are applied to the angles or positions of the tool. Such a rotation would require that the end opposite the tip move through an approximately 15 cm arc, which implies that the relative motions of the opposite ends of the tool need to be controlled with relative motion ratio of approximately 10,000 to 1. Even with the aid of a device to steady, filter, and/or scale hand motions, as long as generalized rotations (i.e., rotations about any axis) and translations of the tool are allowed, the geometrical requirements for this motion can make such generalized tool motions extremely hard for an operator to control; for example, even scaling hand motion by a factor of 100 would still require a precision of 100 to 1 for the geometry of this example. The device described here reduces these control difficulties by ensuring that translational directive forces do not cause unrestricted rotations. This is done using multiple methods. One method used by this device for reducing control-difficulties due to rotation is that the tool tip can be positioned so that it is at or near to the mechanically determined axes of rotation, which reduces translation of the tool tip during rotation (compared to a more general rotation). Another method is that, as previously described, translation of the tool can be directed independently from rotation of the tool, so that the control of translation of the tool is largely decoupled from rotation of the tool. For example, the device can be conveniently used without significant rotation of the tool; and for rotations in critical locations, the tool can be translated sufficiently far away from the critical region to account for any translations that may occur during rotation the rotation can be applied, and the tool can be translated back to the critical location.

These two methods for coping with inherent difficulties of generalized rotational control on precision hand-guided movements are presented for the device of the current invention, but their application to other devices is also considered to be within the scope of this invention. For example, other surgical robots that use band guided motion control can have a "microsurgical mode", or be designed strictly fit microsurgery, where: 1) rotations are only allowed about a specific axis or point; 2) translation and rotation are controlled independently. For item 1, the rotation can be established about any fixed point or axis; this fixed point or axis can be established even if there is no mechanical component aligned with it, but instead, a virtual fixed point or axis can be used that is implemented through the combined controlled motion of multiple components; commonly, the fixed point or axis of rotation will be close to the tool tip, which is commonly close to the most critical part of the object, but this is not a requirement, and the scope of this invention is not limited to this choice; the fixed point or axis of rotation can be selected by the user and changed at any time, and can, for example, be marked onto a tool, where the position of these markings was also included in the algorithm of the controlling processor, in order to establish this as the fixed point or axis. For item 2: the goal of independent control is to have directive motions for rotational control so that they correspond only to the angle of rotation, either in one dimension, or two, but not direct translation of the fixed point or axis of rotation, and to have motions that direct translation correspond to pure translating motion in space without directing rotation; this can be implemented by temporally switching between rotational and translational control, so that directive control for only one of either rotation or translation is active at the same time, or, for example, by having different parts of the body control translation and rotation, for example, when translation is controlled by hand motion, rotation can be controlled by, for example, motion of a finger, foot, or hand different from the one directing rotation.

The present invention also relates to methods for controlling a tool or stabilizing the motion of a tool. In one embodiment, the method of the present invention comprises the steps of: sensing a force applied to a grip via a sensor assembly, wherein the grip is associated with a tool, sending an input signal to a microprocessor indicative of the applied force, sending an output signal from the microprocessor to a micromanipulator, wherein the output signal directs the micromanipulator to apply movement to the grip in the direction of the applied force. In one embodiment, the tool associated with the grip is selected from the group consisting of a forceps, scalpel, needle, and drill. In another embodiment, the output signal is produced by applying a gain to the input signal. In yet another embodiment, the micromanipulator applies movement to the grip via the sensor assembly.

The disclosures of each and every patent, patent application, and publication wed herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A device for controlling a tool, comprising:
   a micromanipulator;
   a grip configured to hold the tool and to be grasped by a user, wherein the grip comprises a first portion, and a second portion configured to hold the tool and to rotate relative to the first portion; wherein the first portion is configured to allow the user to apply forces and torques to the first portion without causing the second portion to rotate relative to the first portion;
   at least one sensor;
   a flexible assembly comprising:
      a first subassembly comprising a first support, a second support, a first flexible element operably connected to the first support and the second support, and a second flexible element operably connected to the first support and the second support; and
      a second subassembly comprising a third support, a fourth support, a third flexible element operably connected to the third support and the fourth support, and a fourth flexible element, operably connected to the third support and the fourth support;
      a third subassembly comprising a fifth support, a sixth support, a fifth flexible element operably connected to the fifth support and the sixth support, and a sixth flexible element operably connected to the fifth support and the sixth support;
      wherein the flexible elements are springs;
      wherein the first and the second flexible elements are substantially parallel to each other;
      wherein the third and the fourth flexible elements are substantially parallel to each other;
      wherein the fifth and the sixth flexible elements are substantially parallel to each other;
      wherein the first and the second subassemblies are operably connected;
      wherein the second and the third subassemblies are operably connected; and
      wherein the first, the second, and the third subassemblies are substantially in series with each other;
   wherein the grip is operably connected to the first support;
   wherein the at least one sensor is configured to generate an output responsive to an input of an external force or an external torque exerted on the grip in at least two independent directions;
   a controller communicatively coupled to the micromanipulator and the at least one sensor, wherein the controller is configured to generate an output in response to the output of the at least one sensor,
   wherein the micromanipulator is operably connected to the sixth support and configured to exert a force on the flexible assembly in response to the output of the controller and to translate the sixth support of the flexible assembly in three degrees of freedom, and
   wherein the flexible assembly is configured to transmit the force received from the micromanipulator to the tool and the force moves the tool in approximately only one movement of a translation movement and a rotation movement.

2. The device of claim 1, wherein the flexible elements are each independently selected from the group consisting of sheet springs and notch-type springs.

3. The device of claim 1, wherein the flexible assembly is configured to not rotate the tool in response to the external force or the external torque exerted on the grip.

4. The device of claim 1, wherein the flexible assembly is configured to move the tool in relation to the micromanipulator in a range of about 0 microns to about 500 microns.

5. The device of claim 1, wherein the second portion is configured so that the rotation of the second portion relative to the first portion has a fixed point on or near the tip of the tool.

6. The device of claim 1, wherein the grip is configured so that the second portion can be rotated without transferring the external force or external torque to the flexible assembly.

7. The device of claim 6, wherein:
   the second portion of the grip comprises a body having substantially cylindrical member and
   the first portion of the grip comprises a body comprising a structure to hold the substantially cylindrical member, wherein the body of the first portion is configured to retain the substantially cylindrical portion in stable contact with the structure.

8. The device of claim 1, wherein the grip comprises a rotational mount mechanically coupled to the flexible assembly and an arm configured to securely fit with the rotational mount and the grip; wherein the rotational mount is configured to permit the arm to rotate on a selective basis.

9. The device of claim 8, wherein the rotational mount is configured to provide absolute locking of the rotation of the arm on a selective basis.

10. The device of claim 8, wherein the grip and the tool are configured so that the rotation of the rotational mount has a fixed point on or near the tip of the tool.

11. The device of claim 8, wherein the grip and the tool are configured so that the rotation of the rotational mount has a fixed point within about 5 mm of the tip of the tool.

12. The device of claim 8, wherein the rotational mount comprises:
   a housing;
   a pneumatic piston disposed within the housing;
   an annulus fixed to the arm and disposed for rotation within the housing on a selective basis; and
   a disk disposed within the housing between the piston and the annulus, wherein the piston is configured to exert a variable force that presses the disk into the annulus thereby altering a resistance of the annulus to rotation in relation to the housing.

13. The device of claim 1, further comprising a tool operably connected to the grip.

14. The device of claim 13, wherein the flexible assembly is configured to allow flexion only in translation so that the grip and the tool only move in a translation movement in response to a force applied to the grip.

15. The device of claim 1, wherein the flexible assembly is configured to move in the direction of the external force applied to the grip based upon the force exerted on the flexible assembly by the micromanipulator.

16. The device of claim 1, wherein the micromanipulator is configured to, in response to the output of the controller, move the sixth support at a velocity proportional to the external force on the grip.

17. The device of claim 1, wherein the at least one sensor is selected from the group consisting of an optical sensor, a magnetic sensor, an inductive sensor, and a capacitive sensor.

* * * * *